United States Patent
Vanbergen et al.

(10) Patent No.: US 12,410,276 B2
(45) Date of Patent: Sep. 9, 2025

(54) METHOD OF RECYCLING POLYURETHANE MATERIALS

(71) Applicant: RECTICEL, Brussels (BE)

(72) Inventors: Thomas Vanbergen, Schulen (BE); Dirk De Vos, Holsbeek (BE); Laurens Claes, Mechelen (BE); Isabel Verlent, Wetteren (BE); Joke De Geeter, Wetteren (BE)

(73) Assignee: Carpenter Engineered Foams Belgium BV, Machelen (BE)

( * ) Notice: Subject to any disclaimer, the term of this patent is extended or adjusted under 35 U.S.C. 154(b) by 752 days.

(21) Appl. No.: 17/633,043

(22) PCT Filed: Aug. 7, 2020

(86) PCT No.: PCT/EP2020/072323
§ 371 (c)(1),
(2) Date: Feb. 4, 2022

(87) PCT Pub. No.: WO2021/023889
PCT Pub. Date: Feb. 11, 2021

(65) Prior Publication Data
US 2022/0325031 A1    Oct. 13, 2022

(30) Foreign Application Priority Data
Aug. 8, 2019   (EP) ...................... 1910896

(51) Int. Cl.
*C08G 18/76* (2006.01)
*C08G 18/48* (2006.01)
*C08J 11/24* (2006.01)
*C08K 5/00* (2006.01)

(52) U.S. Cl.
CPC .......... *C08G 18/7621* (2013.01); *C08G 18/48* (2013.01); *C08J 11/24* (2013.01); *C08K 5/0033* (2013.01); *C08J 2375/08* (2013.01)

(58) Field of Classification Search
CPC ...... C08G 18/7621; C08G 18/48; C08J 11/24; C08J 2375/08; C08J 18/48; C08J 18/7621; C08K 5/0033
See application file for complete search history.

(56) References Cited

U.S. PATENT DOCUMENTS

| | | | |
|---|---|---|---|
| 3,304,273 A | 2/1967 | Stamberger | |
| 3,325,421 A | 6/1967 | Muller | |
| 3,383,351 A | 5/1968 | Stamberger | |
| 4,316,992 A | 2/1982 | Gerlock et al. | |
| 4,317,939 A | 3/1982 | Gerlock et al. | |
| 5,714,523 A * | 2/1998 | Hopper | C08J 11/10 521/49 |

FOREIGN PATENT DOCUMENTS

| | | |
|---|---|---|
| JP | 2000-505125 A | 4/2000 |
| WO | 9510562 A1 | 4/1995 |
| WO | 9727243 A1 | 7/1997 |
| WO | 1997027243 A1 | 7/1997 |
| WO | 0210245 A1 | 2/2002 |

OTHER PUBLICATIONS

Gogoll et al., Chem. Eur. J., (20010000), vol. 7, pp. 396-403.

* cited by examiner

*Primary Examiner* — Christina H. W. Rosebach
(74) *Attorney, Agent, or Firm* — Dickinson Wright PLLC

(57) ABSTRACT

A method for alcoholising and hydrolysing polyurethane (PUR) materials made from at least one polyol compound and at least one toluene diisocyanate based compound; wherein the method comprises the following steps: contacting the polyurethane material with at least one alcoholising compound, thereby forming a reaction mixture ($M_0$) and allowing the polyurethane material and the alcoholising compound to react in said reaction mixture ($M_0$), thereby forming a mixture (M); allowing the mixture (M) to separate into at least an upper phase and a lower phase, wherein phase (A) and phase (B) are two immiscible phases; subjecting phase (B) to at least one hydrolysis step, thereby forming a phase (B1); wherein the at least one alcoholising compound is characterized by a melting point of lower than 200° C.; wherein the at least one alcoholising compound is characterized by a hydroxyl functionality of at least 2; and with the proviso that the at least one alcoholising compound is not glycerol.

17 Claims, No Drawings

METHOD OF RECYCLING POLYURETHANE MATERIALS

CROSS-REFERENCE TO RELATED APPLICATIONS

This is a US national stage application of PCT International Application No. PCT/EP2020/072323 filed on Aug. 7, 2020, which claims priority from EP19190896.1, filed Aug. 8, 2019, the contents of which (including all attachments filed therewith) are hereby incorporated by reference in their entirety.

FIELD OF THE INVENTION

The present invention relates to an improved method for the recycling of polyurethane (PUR) materials. The present invention further relates to the products obtained by this method and their use.

BACKGROUND OF THE INVENTION

Polyurethane (PUR) materials are generally produced by the reaction of polyisocyanate compounds, particularly diisocyanates, with isocyanate reactive compounds such as hydroxyl group containing compounds like glycols, polyester polyol and polyether polyol compounds or amine group containing compounds such as aromatic and aliphatic diamines and polyamines. The chemical nature and the relative amounts of the reagents can be selected in function of the desired final properties of the PUR materials. This flexibility and wide range of different physical and chemical properties ensure that PUR materials find widespread use. Consequently PUR materials are widely used as flexible, semi-rigid, rigid and reinforced rigid PUR foams in furniture and bedding, cushioning materials in the automotive industry, as thermal insulation in the construction or the refrigeration industry and also as PUR elastomers in shoe soles, as coatings, adhesives or sealants.

The extensive industrial use of PUR materials and the production thereof is accompanied by a considerable accumulation of waste or scrap of these PUR materials. A large quantity of PUR material scrap is generated during the slabstock manufacturing process. In such operations, from 10% to about 30% of the virgin PUR materials may end up as scrap. This scrap PUR material may be reused for instance by grinding it to PUR powder and adding this powder as a filler in the PUR formulation, or for instance in a rebonding process whereby the waste foam fragments are bonded to each other by means of a binder to produce carpet underlays, pillow fillings or athletic mats.

The major amount of PUR material scrap is however constituted by the end of life (EoL) PUR foam. Yearly more than 30 million mattresses currently reach their end of life, as well as more than 1500 kton of upholstered furniture in the EU. This represents more than 600 kton of PUR foam. The main waste processing technologies for this EoL PUR foam include incineration and landfill. However such disposal techniques, besides representing an environmental pollution problem, have an economic loss associated with both the land required for landfill and the permanent loss of costly materials as used in the preparation of PUR materials. Therefore, the main interest is to consider the recovery and eventual reuse of such materials.

The known methods for reuse or recycling of PUR materials mainly consist of energy recovery, physical recycling and chemical depolymerisation. In energy recovery methods, the PUR material is used as a fuel and energy is recovered by using the heat and vapour that are produced. However, in this process exhaust fumes are generated which should be strictly controlled to avoid new pollution problems. Physical recycling processes are limited by the thermoset character of PUR materials and often produce end-products of inferior quality. Therefore, it is highly desirable to use chemical depolymerisation to recover the chemical constituents of the PUR material, such as the polyol or polyisocyanate compound, to manufacture new PUR materials.

Chemical depolymerisation of PUR materials is well known in the art and may be achieved, amongst other processes, by hydrolysis, hydroalcoholysis, alcoholysis and aminolysis.

The most commonly used method in chemical depolymerisation of PUR materials is the alcoholysis method, sometimes referred to as glycolysis method, and involves mixing the PUR materials with one or more compounds containing at least two reactive hydroxyl groups, i.e. an alcoholising compound. The mixture is reacted at a high temperature to produce a liquid product comprising a mixture of compounds containing hydroxyl end groups (the recovered polyol), the alcoholising compound(s), amine compounds derived from the polyisocyanate compounds used in the starting PUR material, as well as dicarbamate and carbamate-amine derivatives of these polyisocyanate compounds. The alcoholising methods for PUR materials known in the art are either mono-phase methods or split-phase methods.

U.S. Pat. Nos. 4,316,992 and 4,317,939 both disclose a mono-phase alcoholysis-hydrolysis methodology. The alcoholysis is carried out by reacting polyether polyurethane foams with saturated alcohols having a boiling point between 185-220° C. The hydroxyl functionality of this saturated alcohol causes dissolution of the polyurethane, thereby forming dissolution products which comprise polyol, ureas, and carbamates. The dissolution products are further subjected to hydrolysis until substantially all the carbamates and urea have been hydrolysed to amines and alcohol. In U.S. Pat. No. 4,317,939, the hydrolysis was carried out by adding water and an alkali metal hydroxide to the solution. In U.S. Pat. No. 4,316,992, the hydrolysis is carried out by introducing superheated steam through the solution. An alkali metal hydroxide may be added to said solution prior to hydrolysis. During hydrolysis, the steam removes the amines as well as some of the alcohol. The exiting steam, containing amines and alcohol, is cooled by means of a condenser and is collected. The hydrolysed solution of U.S. Pat. Nos. 4,316,992 and 4,317,939 in its entirety is further subjected to a vacuum purification in order to recover substantially pure polyol. Alternatively, if the hydrolysed solution can separate into a polymer layer (i.e. polyol layer) and an alcohol layer, it is the polymer layer (i.e. polyol layer) that is removed and further subjected to a vacuum purification.

In the split-phase method at least two phases are formed, most commonly referred to as the upper phase and bottom or lower phase. Most commonly, the upper phase predominantly comprises the recovered polyol compound which in the best case is similar to the polyol compound which was used to prepare the PUR material. The split-phase alcoholysis method allows to obtain a higher purity recovered polyol compound which is less contaminated than in the mono-phase method. It is beneficial to obtain a recovered polyol compound which is very similar in terms of molecular weight and in particular hydroxyl value, to the polyol compound which was originally used to prepare the PUR material. When the properties are similar, the recovered polyol compound can be employed to replace up to 100% of the virgin polyol compounds to prepare new PUR materials.

WO 95/10562 and WO 97/27243 notably propose said split-phase alcoholysis processes. WO 95/10562 is mainly concerned with recycling the polyol from the upper phase after split-phase alcoholysis. In WO 95/10562, the upper phase predominantly contains a polyol having a high molecular weight and the lower phase predominantly contains products having a low molecular weight comprising urea, urethane, amine and hydroxyl groups together with the alcoholising polyol. However, a drawback of the method of WO 95/10562 is that it requires a lot of extra intensive purification steps (e.g. multiple extractions followed by a long-term distillation step and a filtration step) to obtain the high purity recovered polyol compound. Furthermore, the lower phase may be subjected to an alkoxylation reaction with the aim to form notably products having a hydroxyl value of 300 to 1000 mg KOH/g, which after evaporation of the more volatile compounds gives a product having a hydroxyl value of 250 and 600 mg KOH/g.

In WO 97/27243 two different split-phase alcoholysis-hydrolysis processes of flexible PUR foams are disclosed with regards to the difference whether the subsequent hydrolysis event is conducted before or, alternatively, after the reaction mixture is allowed to separate in an upper phase and a lower phase. In all the examples, only MDI-based, polyether polyol-based, fully water blown flexible PUR foams have been subjected to the described split-phase alcoholysis-hydrolysis processes. The alcoholising polyol is selected from glycerol and an oxyethylene polyol having a molecular weight of 62-500, which has a hydroxyl functionality of 2-8. Ethylene glycol, glycerol, trimethylol propane, pentaerythritol, sorbitol, and sucrose are listed as examples of suitable alcoholising polyols. Also in WO 97/27243, the hydrolysed mixture of the lower phase, is subjected to an evaporation or distillation step in order to remove the alcoholising polyol thereby forming a concentrated hydrolysed lower phase which is then alkoxylated. The alkoxylated products are then used in the preparation of rigid PUR foams. WO 97/27243 is totally not concerned with recycling the amine compounds derived from the polyisocyanate compounds used in the starting PUR material, as well as dicarbamate and carbamate-amine derivatives of these polyisocyanate compounds from the lower phase after split-phase alcoholysis.

Therefore, there remains a need for an improved split-phase method for alcoholising and hydrolysing PUR materials which is economically advantageous to operate and which yields at least two phases, one phase comprising a high quality recovered polyol compound in such a way that the recovered polyol compound may replace the originally used polyol compound in a PUR material formulation up to 100% without the need of extensive purification and at least another phase comprising diamine compounds in a high yield, so that these can, after conversion to their respective isocyanate compounds, be reused for producing new PUR materials. Such a method would allow to recycle and recover both the polyol compound from one phase and the diamine compounds from the other phase and to reuse said polyol compound and diamine compounds in a process for preparing new polyurethane materials. In this way, in the long term, a sustainable circular process is created whereby the volumes remain in balance and whereby the waste production is reduced to a minimal extent.

SUMMARY OF THE INVENTION

The inventors have now surprisingly found that it is possible to provide an improved split-phase alcoholysis-hydrolysis method of PUR materials fulfilling the above-mentioned needs.

Thus, the object of the present invention is to provide a method for alcoholising and hydrolysing polyurethane (PUR) materials made from at least one polyol compound and at least one toluene diisocyanate based compound [hereinafter TDI compound]; wherein the method comprises the following steps:
contacting the polyurethane material with at least one alcoholising compound, thereby forming a reaction mixture ($M_0$) and allowing the polyurethane material and the alcoholising compound to react in said reaction mixture ($M_0$), thereby forming a mixture (M);
allowing the mixture (M) to separate into at least an upper phase [hereinafter phase (A)] and a lower phase [hereinafter phase (B)], wherein phase (A) and phase (B) are two immiscible phases;
subjecting phase (B) to at least one hydrolysis step, thereby forming a phase (B1);
wherein the at least one alcoholising compound is characterized by a melting point of lower than 200° C.; wherein the at least one alcoholising compound is characterized by a hydroxyl functionality of at least 2; and with the proviso that the at least one alcoholising compound is not glycerol.

DETAILED DESCRIPTION

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a composition comprising components A and B" should not be limited to composition consisting only of components A and B. It means that with respect to the present invention, the only relevant components of the composition are A and B. Accordingly, the terms "comprising" and "including" encompass the more restrictive terms "consisting essentially of" and "consisting of".

Within the context of the present invention, the expression "at least one alcoholising compound" is intended to denote one or more than one alcoholising compound. Mixtures of alcoholising compounds can also be used for the purpose of the invention. In the remainder of the text, the expression "alcoholising compound" is understood, for the purposes of the present invention, both in the plural and the singular form.

In the context of the present invention, the prefix "poly" is used for meaning "more than one", which when limited to integers is the same as "2 or more" or "at least 2". The term "polyol" therefore stands for a compound having at least 2 alcohol or hydroxyl (—OH) functional groups. The term "polyisocyanate" thus stands for a compound having at least 2 isocyanate (NCO or more correctly —N=C=O) functional groups.

Thus, in the method of the present invention use is made of at least one alcoholising compound having a melting point lower than 200° C. and a hydroxyl functionality of at least 2.

Within the context of the present invention, the term "alcoholising compound" is intended to denote those compounds which are able to alcoholise PUR materials. Preferably those alcoholising compounds are immiscible with the recovered polyol compound obtained in the alcoholysis method. The term "immiscible" is used in its conventional sense to refer to two compounds that are less than completely miscible, in that mixing two such compounds results in a mixture containing more than one phase. It is preferred that at most 30%, preferably at most 20%, more preferably at most 10%, even more preferably at most 5% by weight of alcoholising compound can be dissolved in the recovered polyol compound at room temperature. Preferably, the alcoholising compounds have a larger density than the density of the recovered polyol compound.

Within the context of the present invention, the term "hydroxyl functionality" of an alcoholising compound refers to the number of hydroxyl (—OH) functional groups per molecule, on average.

Preferably, the hydroxyl functionality of the at least one alcoholising compound as used in the method according to the present invention is at least 2, more preferably at least 3 or 4 and preferably the hydroxyl functionality of the at least one alcoholising compound is at most 8, more preferably at most 7, even more preferably at most 6.

It is further understood that within the context of the present invention the melting point of the at least one alcoholising compound, as detailed above, is a property that can be measured according to standard methods in the art. Known methods for measuring the melting point of compounds are notably the use of a capillary tube in a liquid bath, a capillary tube in a metal block, a Kofler hot bar, a melt microscope, differential thermal analysis (DTA), differential scanning calorimetry (DSC), freezing temperature, pour point etc.

Preferably, the melting point of the at least one alcoholising compound as used in the method according to the present invention is measured according to the OECD 102 guidelines for the testing of chemicals by differential scanning calorimetry (DSC) and more specifically according to the ASTM E472-86, ASTM E473-85, ASTM E537-76 and DIN 51005 standard methods.

Preferably, the melting point of the at least one alcoholising compound as used in the method according to the present invention is lower than 180° C., more preferably lower than 160° C.

In a preferred embodiment of the method according to the present invention, each of the alcoholising compounds, as detailed above, has a hydroxyl functionality of at least 4 and a melting point of lower than 180° C., more preferably lower than 160° C.

As non-limiting examples of alcoholising compounds having a melting point lower than 200° C., mention may be made of diethylene glycol, 2,4-bis(hydroxymethyl)-1,5-pentanediol, diglycerol, ethylene glycol, (meso-)erythritol, xylitol, sorbitol, mannitol, fucitol, iditol, arabitol, ribitol, galactitol, 1,5-pentanediol, 2-(hydroxymethyl)-1,5-pentanediol, 2,2-bis(hydroxymethyl)-1,5-pentanediol, 2,2,4-tris(hydroxymethyl)-1,5-pentanediol, 2,2,4,4-tetrakis(hydroxymethyl)-1,5-pentanediol, 2,5-anhydromannitol, 3-hydroxymethyl-1,3,5-pentanetriol, 3,4-bis(hydroxymethyl)-1,6-hexanediol, N,N,N',N'-tetrakis(2-hydroxyethyl)ethylenediamine, P,P,P,P-tetrakis(2-hydroxyethyl)phosphonium chloride, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 1,3,5,7-heptanetetraol, 2-hydroxymethyl-3-hydroxy-3-methyl-1,5-pentanediol, 4-hydroxymethyl-1,3,5-hexanetriol, 3-methyl-1,3,5,7-heptanetetraol, 4-hydroxymethyl-3-hydroxy-3-methyl-1,5-hexanediol, 2,2-bis(hydroxymethyl)-1,4-butanediol, 3-methyl-2,3,5,6-heptanetetraol, 3,5-bis(hydroxymethyl)-2,6-heptanediol, 2,2-bis(hydroxymethyl)-1,3-butanediol, 1,3,5-pentanetriol, 2,6-bis(hydroxymethyl)-1,7-heptanediol, 2,2'-(methylazanediyl)bis(1,3-propanediol), 2,5-bis(hydroxymethyl)-1,6-hexanediol, 1,3,4,6-hexanetetraol, 1,1,3,3-tetrakis(hydroxymethyl)-2-butanol, 3-hydroxy-2,4-dimethyl-2,4-bis(hydroxymethyl)-1,5-pentanediol, trimethylolpropane, trimethylolethane, di(trimethylolpropane), di(trimethylolethane) or mixtures of two or more thereof.

Within the context of the present invention, the term "1,2-diol motif" is intended to denote 2 hydroxyl functionalities occupying vicinal positions, i.e. that said 2 hydroxyl functionalities are directly attached to adjacent carbon atoms.

Preferably, the at least one alcoholising compound has further no 1,2-diol motif.

As non-limiting examples of alcoholising compounds having a melting point lower than 200° C. and having no 1,2-diol motif, mention may be made of diethylene glycol, 2,4-bis(hydroxymethyl)-1,5-pentanediol, 1,5-pentanediol, 2-(hydroxymethyl)-1,5-pentanediol, 2,2-bis(hydroxymethyl)-1,5-pentanediol, 2,2,4-tris(hydroxymethyl)-1,5-pentanediol, 2,2,4,4-tetrakis(hydroxymethyl)-1,5-pentanediol, 3,4-bis(hydroxymethyl)-1,6-hexanediol, N,N,N',N'-tetrakis(2-hydroxyethyl)ethylenediamine, P,P,P,P-tetrakis(2-hydroxyethyl)phosphonium chloride, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 1,3,5,7-heptanetetraol, 2-hydroxymethyl-3-hydroxy-3-methyl-1,5-pentanediol, 4-hydroxymethyl-1,3,5-hexanetriol, 3-methyl-1,3,5,7-heptanetetraol, 4-hydroxymethyl-3-hydroxy-3-methyl-1,5-hexanediol, 2,2-bis(hydroxymethyl)-1,4-butanediol, 3,5-bis(hydroxymethyl)-2,6-heptanediol, 2,2-bis(hydroxymethyl)-1,3-butanediol, 1,3,5-pentanetriol, 2,6-bis(hydroxymethyl)-1,7-heptanediol, 2,2'-(methylazanediyl)bis(1,3-propanediol), 2,5-bis(hydroxymethyl)-1,6-hexanediol, 1,1,3,3-tetrakis(hydroxymethyl)-2-butanol, 3-hydroxy-2,4-dimethyl-2,4-bis(hydroxymethyl)1,5-pentanediol, trimethylolpropane, trimethylolethane, di(trimethylolpropane), di(trimethylolethane) or mixtures of two or more thereof.

More preferably, the at least one alcoholising compound has further no 1,2-diol motif and no 1,4-diol motif.

As non-limiting examples of alcoholising compounds having a melting point lower than 200° C., and having no 1,2-diol motif and having no 1,4-dial motif, mention may be made of diethylene glycol, 2,4-bis(hydroxymethyl)-1,5-pentanediol, 1,5-pentanediol, 2-(hydroxymethyl)-1,5-pentanediol, 2,2-bis(hydroxymethyl)-1,5-pentanediol, 2,2,4-tris(hydroxymethyl)-1,5-pentanediol, 2,2,4,4-tetrakis(hydroxymethyl)-1,5-pentanediol, N,N,N',N'-tetrakis(2-hydroxyethyl)ethylenediamine, P,P,P,P-tetrakis(2-hydroxyethyl)phosphonium chloride, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 1,3,5,7-heptanetetraol, 2-hydroxymethyl-3-hydroxy-3-methyl-1,5-pentanediol, 4-hydroxymethyl-1,3,5-hexanetriol, 3-methyl-1,3,5,7-heptanetetraol, 4-hydroxymethyl-3-hydroxy-3-methyl-1,5-hexanediol, 3,5- bis(hydroxymethyl)-2,6-heptanediol, 2,2-bis(hydroxymethyl)-1,3-butanediol, 1,3,5-pentanetriol, 2,6-bis(hydroxymethyl)-1,7-heptanediol, 2,2'-(methylazanediyl)bis(1,3-propanediol), 2,5-bis(hydroxymethyl)-1,6-hexanediol, 1,1,3,3-tetrakis(hydroxymethyl)-2-butanol, 3-hydroxy-2,4-dimethyl-2,4-bis(hydroxymethyl)-1,5-pentanediol, trimethylolpropane, trimethylolethane, di(trimethylolpropane), di(trimethylolethane) or mixtures of two or more thereof.

Preferably, the at least one alcoholising compound is selected from diethylene glycol, 2,4-bis(hydroxymethyl)-1,5-pentanediol, 1,5-pentanediol, 2-(hydroxymethyl)-1,5-pentanediol, 2,2-bis(hydroxymethyl)-1,5-pentanediol, 2,2,4-tris(hydroxymethyl)-1,5-pentanediol, 2,2,4,4-tetrakis(hydroxymethyl)-1,5-pentanediol, N,N,N',N'-tetrakis(2-hydroxyethyl)ethylenediamine, P,P,P,P-tetrakis(2-hydroxyethyl)phosphonium chloride, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 3,5-bis(hydroxymethyl)-2,6-heptanediol, 1,3,5-pentanetriol, 2,6-bis(hydroxymethyl)-1,7-heptanediol, 2,5-bis(hydroxymethyl)-1,6-hexanediol, trimethylolpropane, trimethylolethane, di(trimethylolpropane), di(trimethylolethane) or mixtures of two or more thereof.

More preferably, the at least one alcoholising compound is selected from diethylene glycol, 2,4-bis(hydroxymethyl)-1,5-pentanediol, 1,5-pentanediol, 2-(hydroxymethyl)-1,5-pentanediol, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 3,5-bis(hydroxymethyl)-2,6-heptanediol, 2,6-bis(hydroxymethyl)-1,7-heptanediol, 2,5-bis(hydroxymethyl)-1,6-hexanediol or mixtures of two or more thereof.

More preferably, the at least one alcoholising compound is selected from diethylene glycol, 2,4-bis(hydroxymethyl)-1,5-pentanediol, 1,5-pentanediol, di-2-glyceryl ether or 2,4-bis(hydroxymethyl)-3-oxopentane-1,5-diol, 3,5-bis(hydroxymethyl)-2,6-heptanediol, 2,5-bis(hydroxymethyl)-1,6-hexanediol or mixtures of two or more thereof.

Even more preferably, the at least one alcoholising compound is selected from diethylene glycol, 2,4-bis(hydroxymethyl)-1,5-pentanediol or mixtures of two or more thereof.

Most preferably, the at least one alcoholising compound is 2,4-bis(hydroxymethyl)-1,5-pentanediol.

The at least one alcoholising compound may be commercially available or may be chemically synthesised. Said syntheses of the alcoholising compounds may be carried out using conventional methods known to the skilled in the art.

The polyurethane (PUR) material that is to be alcoholised and hydrolysed by the method according to the present invention is made by reacting at least one polyisocyanate compound with at least one polyol compound having a hydroxyl value X, optionally a blowing agent and optionally a chain extender or cross-linker and additives conventionally used in preparing PUR materials.

In a preferred embodiment of the method according to the present invention, the at least one polyol compound is characterized by a hydroxyl value X wherein X is at least 15 mg KOH/g, preferably equal to or at least 20 mg KOH/g, even more preferably at least 25 mg KOH/g.

It is further understood that the hydroxyl value X of the at least one polyol compound is advantageously equal to or lower than 200 mg KOH/g, preferably equal to or lower than 150 mg KOH/g, more preferably equal to or lower than 100 mg KOH/g, even more preferably equal to or lower than 75 mg KOH/g, most preferably equal to or lower than 50 mg KOH/g.

Within the context of the present invention, the term "hydroxyl value X", "OH number X" and similar expressions are intended to denote the hydroxyl (OH) content as analysed according to standard titration methods such as ASTM 4274, ISO 14900 or ASTM E1899, and is expressed in mg KOH/g of sample, unless mentioned otherwise.

It is understood that mixtures of polyol compounds may be used. In this case, the hydroxyl value X of the polyol compound is the average hydroxyl value of the mixture of polyol compounds. It is further understood that when commercially available polyol compound mixtures are used, the hydroxyl value may be influenced by other ingredients such as crosslinkers present in said mixtures. However, this contribution is assured to be negligible.

In a preferred embodiment of the method according to the present invention, the PUR material is a PUR foam and more preferably a flexible PUR foam.

The expression "PUR foam" as used herein generally refers to cellular products as obtained by reacting polyisocyanate compounds with polyol compounds, using foaming or blowing agents, and in particular includes cellular products obtained with water as reactive foaming or blowing agent.

Such PUR foams, ingredients used for preparing the PUR foams and processes for preparing such PUR foams have been described extensively in the art. PUR foams may be produced by reacting polyisocyanate compounds with polyol compounds.

Within the context of the present invention, the at least one toluene diisocyanate based compound [hereinafter TDI compound] is intended to refer to toluene diisocyanate, prepolymers of toluene diisocyanate, as well as modified TDI based polyisocyanate compounds, such as allophanate-modified TDI, urethane-modified TDI, biurete-modified TDI as well as oxazolidone-modified TDI.

The toluene diisocyanate (TDI) may be selected from pure 2,4-TDI and commercially available isomeric mixtures of 2,4-TDI and 2,6-TDI. Non-limiting examples of isomeric mixtures of 2,4-TDI and 2,6-TDI include TDI 8020 (80% 2,4/20% 2,6 isomers) and TDI 6535 (65% 2,4/35% 2,6 isomers). Mixtures of these isomeric mixtures may be applied as well, in terms of targeting optimal material properties such as low density potential and a very linear and predictable response in terms of density versus water level, as described in the art such as in WO 02/10245.

Modified TDI based polyisocyanate compounds are also useful. Such modified TDI based polyisocyanate compounds are generally prepared through the reaction of TDI, with a low molecular weight diol or amine. Modified TDI based polyisocyanate compounds can also be prepared through the reaction of the TDI based polyisocyanate compounds with themselves, producing polyisocyanate compounds containing allophanate, uretonimine, carbodiimide, urea, biuret or isocyanurate linkages.

Mixtures of two or more TDI compounds as mentioned above may be used to target the desired processing or material properties if desired.

Suitable polyol compounds for preparing such PUR foams may be selected from polyether, polyester, polyesteramide, polythioether, polycarbonate, polyacetal, polyolefin and polysiloxane polyols, polyols derived from vegetable oils, other biobased polyols and mixtures of two or more thereof. Preferably, the polyol compound is a polyether polyol.

Non-limiting examples of polyether polyols which may be used for preparing such PUR foams include these polyether polyols which are prepared by allowing one or more alkylene oxides or substituted alkylene oxides to react with one or more active hydrogen containing initiators.

Suitable oxides are for example ethylene oxide, propylene oxide, tetrahydrofuran, butylene oxides, styrene oxide, epichlorhydrin and epibromhydrin. Mixtures of two or more oxides may be used. Suitable initiators are for example water, ethylene glycol, propylene glycol, butanediol, hexanediol, glycerol, trimethylol propane, pentaerythritol, sorbitol, sucrose, hexanetriol, hydroquinone, resorcinol, catechol, bisphenols, novolac resins and phosphoric acid. Further suitable initiators are for example ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphthalene-1,5-diamine, 4,4'-di(methylamino)-diphenylmethane, 1-methyl-2-methylamino-4-aminobenzene, 1,3-diethyl-2,4-diaminobenzene, 2,4-diamonomesitylene, 1-methyl-3,5-diethyl-2,4-diaminobenzene, 1-methyl-3,5diethyl-2,6-diaminobenzene, 1,3,5-triethyl-1,2,6-diaminobenzene and 3,5,3',5'-tetraethyl-4,4'-diaminodiphenylmethane. Mixtures of two or more initiators may be used.

Non-limiting examples of polyester polyols which may be used for preparing such PUR foams include hydroxyl-terminated reaction products of polyhydric alcohols such as ethylene glycol, propylene glycol, diethylene glycol, 1,4-butanediol, neopentyl glycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesters obtained by the polymerisation of lactones, for example caprolactone, in conjunction with a polyol, or of hydroxy carboxylic acids such as hydroxy caproic acid, may also be used.

Non-limiting examples of polyols derived from vegetable oils which may be used for preparing such PUR foams include polyols derived from castor oil, soy bean oil, peanut oil, canola oil, and mixtures of two or more thereof.

Suitable polyol compounds for preparing such PUR foams may also include so-called polymer polyols. These are polyol compounds wherein one or more solid polymers is stably dispersed. These polyol compounds are numerously described in the art, such as in U.S. Pat. Nos. 3,383,351 and 3,304,273. Such polymer polyols may be produced by polymerizing one or more ethylenically unsaturated monomers dissolved or dispersed in a polyol compound in the presence of a free radical catalyst to form a stable dispersion of polymer particles in the polyol compound. A wide variety of monomers may be utilized in the preparation of the polymer polyols. Numerous ethylenically unsaturated monomers are disclosed in the prior art and polyurea and polyurethane suspension polymers can also been utilized. Exemplary monomers include styrene and its derivatives such as para-methylstyrene, acrylates, methacrylates such as methyl methacrylate, acrylonitrile and other nitrile derivatives such as methacrylonitrile, and the like. Vinylidene chloride may also be employed. The preferred monomer mixtures used to make the polymer polyols are mixtures of acrylonitrile and styrene (SAN polyols) or acrylonitrile, styrene and vinylidene chloride. These polymer polyol compositions have the valuable property of imparting to PUR foams produced therefrom higher load-bearing properties than are provided by the corresponding unmodified polyol compounds. Suitable polyol compounds for preparing such PUR foams may also include the polyols compounds as taught in U.S. Pat. Nos. 3,325,421 and 4,374,209.

It is understood that the PUR foams as used in the method according to the present invention may further comprise other common additional ingredients conventional to PUR foam formulations. Such other common additional ingredients include, but are not limited to, chain-extending and cross-linking agents, blowing agents, urea and urethane formation enhancing catalysts, surfactants, stabilisers, flame retardants, organic and inorganic fillers, pigments, agents for suppressing the so-called boiling-foam effect, internal mould release agents for moulding applications and antioxidants.

Non-limiting examples of chain-extending and cross-linking agents are amines and polyols containing 2 to 8 and preferably 2 to 4 amine and/or hydroxy groups like ethanolamine, diethanolamine, triethanolamine, ethylene glycol, diethylene glycol, triethylene glycol, propylene glycol, dipropylene glycol, butanediol, glycerol, trimethylolpropane, pentaerythritol, sorbitol, sucrose, polyethylene glycol having an equivalent weight of less than 500, toluene diamine, diethyl toluene diamine, cyclohexane diamine, phenyl diamine, diphenylmethane diamine, an alkylated diphenyl ethane diamine and ethylene diamine.

Advantageously, the amount of chain-extending and cross-linking agents is, when present, up to 25 and preferably up to 10 parts by weight per 100 parts by weight of the polyol compound.

Non-limiting examples of blowing agents which optionally may be used in preparing such PUR foams may be selected from physical blowing agents like chlorofluorocarbons, hydrogen chlorofluorocarbons, hydrogen fluorocarbons and preferably from chemical blowing agents, especially those which lead to $CO_2$ liberation when reacted with the polyisocyanate under foam forming conditions such as water, formic acid and derivatives thereof. Most preferably water is used as the sole blowing agent.

Advantageously, the amount of blowing agent ranges from 2 to 20 preferably from 3 to 15 parts by weight per 100 parts by weight of polyol compound.

The optional common additional ingredients which may be used in preparing such PUR foams may be premixed with the polyol compound before this is reacted with the polyisocyanate compound in order to prepare the PUR foams.

The PUR foams may be made according to the one-shot process, the semi- or quasi prepolymer process or the prepolymer process.

The PUR foams may be slab-stock or moulded PUR foams. The PUR foams in general have a density of 15-80 $kg/m^3$ and may have been used as cushioning material in furniture, car-seats and mattresses for instance.

Although in principle any PUR foam which is TDI-based may be used in the method according to the present invention, flexible TDI-based foams which are fully water blown and which are polyether polyol based are particularly preferred in view of the very good results obtained, as will be described hereinafter. Conventionally, flexible PU foam may be made by reacting the polyether polyol with the TDI based isocyanate, so that the NCO groups and the OH groups form urethane linkages by an addition reaction, and the polyurethane is foamed with carbon dioxide produced in situ by reaction of isocyanate with water. This conventional process may be carried out as a so-called 'one-shot' process whereby the polyol, isocyanate and water are mixed in one step so that the polyurethane is formed and foamed in the same step.

It is however also known to use a two-step process whereby in a first step a prepolymer is formed by reacting an excess of either polyol or isocyanate, so that the prepolymer still contains reactive functional groups of the reagent in excess. The prepolymer is then in a second step reacted with the remaining reagent in the presence of water, so that a foamed polymer is formed.

It is further understood that all definitions and preferences, as described above, equally apply for all further embodiments, as described below.

As said, in the method of the present invention, the PUR material, as detailed above, is contacted with at least one alcoholising compound, as detailed above, thereby forming a reaction mixture ($M_O$) and the PUR material and the alcoholising compound are allowed to react in said reaction mixture ($M_O$) so as to obtain a mixture (M).

In a preferred embodiment of the method of the present invention, the amount of the at least one alcoholising compound, relative to 1 part by weight (pbw) of PUR material, is advantageously equal to or less than 10 pbw, preferably equal to or less than 5 pbw, more preferably equal to or less than 2.5 pbw, even more preferably equal to or less than 1.5 pbw, yet even more preferably equal to or less than 1.0 pbw and most preferably equal to or less than 0.5 pbw.

It is further understood that the amount of the at least one alcoholising compound, relative to 1 pbw of PUR material, is advantageously equal to or greater than 0.1 pbw, preferably equal to or greater than 0.2 pbw, more preferably equal to or greater than 0.3 pbw, even more preferably equal to or greater than 0.4 pbw.

According to certain embodiments of the method according to the present invention, the reaction mixture ($M_O$) further comprises water.

When water is present in the reaction mixture ($M_O$), the amount of water is advantageously at least 0.01 pbw, relative to 1 pbw of PUR material, preferably 0.025 pbw and more preferably 0.05 pbw. It is further understood that the upper limit of the water is not particularly limited but the amount of water present in the reaction mixture ($M_O$) should not adversely affect the phase separation of mixture (M).

In a preferred embodiment of the method according to the present invention, the reaction mixture ($M_O$) further comprises at least one alcoholysis accelerator which accelerates the alcoholysis of the PUR material in the at least one alcoholising compound.

The term "acceleration of alcoholysis" designates the effect that carbamates in the PUR material are converted into compounds comprising a primary and/or secondary amine, such as toluene diamine compounds (TDA compounds); toluene carbamate-amine compounds (TCA compounds); and toluene dicarbamate compounds (TDC compounds); and the respective polyol compound of which the PUR material was made. A part of the alcoholysis accelerator may react with other compounds or by-products, such as isocyanate compounds, present in the mixture ($M_O$).

Suitable alcoholysis accelerators for use in the method of the present invention may include, but are not limited to, heterocyclic amines, straight or branched chain aliphatic amines, cycloalkylamines, aromatic amines or cyclic amides.

Non-limiting examples of heterocyclic amines include piperazine, aminoethylpiperazine, piperidine, morpholine, N-ethylmorpholine, hexamethylenetetraamine, triethylenediamine, 1,8-diazabiclo(5,4,0)-undecene, pyridine, picoline, imidazole, pyrazole, triazole, tetrazole, and the like.

Non-limiting examples of straight chain aliphatic amines include ethylenediamine, diethylenetriamine, triethylenetetraamine, tetraethylenepentaamine, monopropylamine, dipropylamine, monobutylamine, dibutylamine, octylamine, laurylamine, triethylamine, tetramethylenediamine, hexamethylenediamine, monoethanolamine, diethanolamine, triethanolamine, isopropylamine, isobutylamine, diisobutylamine, and the like. Of these compounds, commercially preferred amines are ethylenediamine, diethylenetriamine, monoethanolamine, and the like.

Non-limiting examples of cycloalkylamines include cyclohexylamine, dicyclohexylamine, cyclopentylamine, bisaminomethyl cyclohexane, and the like.

Non-limiting examples of aromatic amines include aniline, phenylenediamine, dimethylaniline, monomethylaniline, toluidine, anisidine, diphenylamine, benzidine, phenetidine, tolidine, benzylamine, xylylenediamine, tolylenediamine, diphenylmethane-4,4'-diamine, and the like.

Non-limiting examples of cyclic amides include α-lactam, β-lactam, pyrrolidone, piperidone, valerolactam and caprolactam.

Preferably, the at least one alcoholysis accelerator for use in the method of the present invention is selected from cyclic amides such as 2-pyrrolidone, valerolactam, caprolactam and mixtures of two or more thereof. More preferably, the at least one alcoholysis accelerator for use in the method of the present invention is 2-pyrrolidone.

Advantageously, the amount of the alcoholysis accelerators, when present, is from 0.01 to 1 parts by weight, more preferably from 0.05 to 0.5 parts by weight, most preferably from 0.08 to 0.2 parts by weight, relative to 1 part by weight of the PUR material.

According to certain embodiments of the method according to the present invention, the reaction mixture ($M_O$) further comprises at least one catalyst to enhance the alcoholysis of the PUR material.

Non-limiting examples of catalysts suitable for use in the method of the present invention may include (organo)tin and bismuth catalysts such as dimethyltin dichloride, butyltin trichloride, dimethyltin dilaurate, dimethyltin dioleate, dimethyltin mercaptide, dibutyltin diacetate, dimethyltin dineodecanoate, bismuth(III) neodecanoate, bismuth 2-ethylhexanoate and triphenylbismuth, alkali metals and alkali metal hydroxides such as potassium hydroxide and sodium hydroxide, titanium(IV) alkoxides such as titanium(IV) propoxide, titanium(IV) butoxide and titanium(IV) tert-butoxide, alkoxide complexes of lithium and potassium such as lithium t-butoxide and potassium t-butoxide, tetrabutyltitanate, potassium acetate, potassium 2-ethylhexanoate, calcium 2-ethylhexanoate, bismuth(III) trifluoromethanesulfonate, iron(III) acetylacetonate, aluminium isopropoxide, dimethylimidazole, potassium adipate and in general urethane-reaction promoting catalysts. Preferably the at least one catalyst is selected from lithium t-butoxide, potassium t-butoxide, potassium hydroxide, aluminium isopropoxide, butyltin trichloride, dimethyltin dilaurate, dibutyltin diacetate, dimethyltin dineodecanoate, bismuth(III) neodecanoate or bismuth(III) 2-ethylhexanoate. More preferably, the at least one catalyst is selected from dibutyltin diacetate, dimethyltin dineodecanoate or bismuth(III) neodecanoate.

Advantageously, the amount of the at least one catalyst, when present, is from 0.001 to 0.3 pbw, more preferably from 0.005 to 0.1 pbw, most preferably from 0.008 to 0.05 pbw, relative to 1 pbw of the PUR material.

According to certain embodiments of the method according to the present invention, the reaction mixture ($M_O$)

further comprises dissolution accelerators which accelerate the dissolution of the PUR material in the one or more alcoholising compounds.

The term "acceleration of dissolution" designates a permeating effect which enables the alcoholising compound to better penetrate into the mass of the PUR material to increase or enlarge the contact area between the PUR material and the alcoholising compound whereby the PUR material easily dissolves.

It is thus understood that some alcoholysis accelerators will function as a dissolution accelerator as well.

Non-limiting examples of dissolution accelerators suitable for use in the method of the present invention may include polyether polyols and other polyols that are suitable to be used with the polyol compounds used in the production of new PUR materials.

PUR material may be contacted with the at least one alcoholising compound in the form in which it is received but preferably the size of the PUR material is reduced, if necessary, in a way suitable for reducing the size and/or for increasing the density of PUR material, like by cutting, milling, pelletizing, grinding, comminution, densification and pressing and any combinations thereof. Although the success of the method of the present invention does not greatly depend on the size of the PUR material it is preferred for efficiency and handling reasons to have PUR material pieces having an average diameter between 0.1 mm and 10 cm, preferably between 0.1 mm and 5 cm and more preferably between 0.1 mm and 3 cm.

Preferably, the PUR material and the at least one alcoholising compound are contacted by adding them in a container suitable to conduct an alcoholysis reaction and by normal mixing, thereby forming a mixture ($M_0$).

Generally, it is understood that the order of addition of each compound of the mixture ($M_0$), such as the PUR material and the at least one alcoholising compound, is not particularly limited. Preferably, a mixture is prepared containing the at least one alcoholising compound, optionally the catalyst and optionally the alcoholysis accelerator. The PUR material is added to this mixture, either or not in intervals. The alcoholysis, i.e. a depolymerisation reaction, starts as soon as the dissolution of the PUR material is complete.

The PUR material and the at least one alcoholising compound are allowed to react in an alcoholysis reaction and preferably, the alcoholysis reaction conditions are chosen in such a way that equilibrium is reached in a reasonable period of time. It is understood that the reaction conditions for the alcoholysis such as temperature, reaction time (including dissolution as well as alcoholysis) and pressure depend on the alcoholising compound that is used and on the scale of the reaction. A person skilled in the art is able to determine suitable reaction conditions.

Generally, the mixture ($M_0$) is subjected to a pressure ranging from ambient pressure to 10 bar, preferably from ambient pressure to 5 bar and most preferably to ambient pressure.

Preferably, the temperature of the mixture ($M_0$) is at least 170° C., more preferably at least 180° C., even more preferably at least 190° C., and preferably at most 240° C., more preferably at most 220° C. and even more preferably at most 210° C.

Preferably, the PUR material and the at least one alcoholising compound are allowed to react during a reaction time of at least 0.5 hours, or at least 1 hour, or at least 1.5 hours, or at least 2 hours.

It is further understood that the reaction time is not particularly limited, however, advantageously the reaction time is at most 48 hours, or at most 24 hours or at most 15 hours, or at most 10 hours, or at most 6 hours.

In a preferred embodiment of the method according to the present invention, the PUR material and the at least one alcoholising compound are allowed to react under stirring and under a $N_2$ blanket.

As said, in the method of the present invention, the formed mixture (M) is allowed to separate into at least an upper phase [hereinafter phase (A)] and a lower phase [hereinafter phase (B)], wherein phase (A) and phase (B) are two immiscible phases. Preferably, the formed mixture (M) is allowed to separate into one upper phase [hereinafter phase (A)] and one lower phase [hereinafter phase (B)], wherein phase (A) and phase (B) are two immiscible phases.

Phase (A), most commonly the upper phase, predominantly comprises at least one recovered polyol compound, i.e. the polyol from which the PUR material was made, while phase (B), most commonly the lower phase, is in general characterised by comprising the at least one alcoholising compound, as detailed above, and by having a higher total content of the TDA compounds, relative to the total content of the TDA compounds in the phase (A), and/or by having a higher total content of the TCA compounds, relative to the total content of the TCA compounds in the phase (A), and/or by having a higher total content of the TDC compounds, relative to the total content of the TDC compounds in the phase (A).

In one embodiment of the method according to the present invention, the phase (B) comprises the TDA compounds. The weight fraction of the TDA compounds [hereinafter (TDA)wt. %] in said phase (B), relative to the total weight of the phase (B), is more than 1.0 wt. %, or more than 2.0 wt. %, or more than 3.0 wt. %, or more than 3.5 wt. %.

In another embodiment of the method according to the present invention, the phase (B) may further comprise the TCA compounds. When present, the weight fraction of the TCA compounds [hereinafter (TCA)wt. %] in said phase (B), relative to the total weight of the phase (B), is more than 2.5 wt. %, or more than 5.0 wt. %, or more than 7.5 wt. %, or more than 8.0 wt. %, or more than 8.5 wt. %.

In another embodiment of the method according to the present invention, the phase (B) may further comprise the TDC compounds. When present, the weight fraction of the TDC compounds [hereinafter (TDC)wt. %] in said phase (B), relative to the total weight of the phase (B), is more than 1.0 wt. %, or more than 3.0 wt. %, or more than 5.0 wt. %, or more than 7.0 wt. %, or more than 9.0 wt. %, or more than 11.0 wt. %, or more than 12.0 wt. %.

In another embodiment of the method according to the present invention, the sum of the weight fractions of the TDA compounds, and the TCA compounds [hereinafter (TDA+TCA)wt. %] in the phase (B), relative to the total weight of the phase (B), is more than 5.0 wt. %, or more than 7.5 wt. %, or more than 10.0 wt. %, or more than 12.5 wt. %, or more than 13.5 wt. %.

In a preferred embodiment of the method according to the present invention, the sum of the weight fractions of the TDA compounds, TCA compounds and the TDC compounds [hereinafter (TDA+TCA+TDC)wt. %] in the phase (B), relative to the total weight of the phase (B), is more than 10.0 wt. %, or more than 12.5 wt. %, or more than 15.0 wt. %.

In another preferred embodiment of the method according to the present invention, the sum of the weight fractions of the TDA compounds, and the TDC compounds [hereinafter (TDA+TDC)wt. %] in the phase (B), relative to the total weight of the phase (B), is more than 5.0 wt. %, or more than 7.0 wt. %, or more than 10.0 wt. %, or more than 13.0 wt. %, or more than 16.0 wt. %.

In a particularly preferred embodiment of the method according to the present invention, the (TDC)wt. % in the phase (B) is higher than the (TDA)wt. % in the phase (B), relative to the total weight of the phase (B).

As said above, the term "immiscible" is used in its conventional sense and it is preferred that at most 30%, preferably at most 20%, more preferably at most 10%, even more preferably at most 5% by weight of one phase of mixture (M), for example the upper phase, can be dissolved in another phase of mixture (M), for example the lower phase, at room temperature.

The mixture (M) is left to stand for a period of time sufficient to allow the mixture (M) to separate into at least two immiscible phases. Generally a period ranging from 1 minute to 24 hours, or from 1 minute to 1 hour will be sufficient. Advantageously, this period is at least 15 minutes, or at least 30 minutes, or at least 1 hour, or at least 2 hours or at least 4 hours, and preferably at most 24 hours, or at most 12 hours, or at most 6 hours, or at most 4 hours, or at most 3 hours.

After the optional stirring of the mixture (M) has been discontinued, the temperature may be maintained while the phases are allowed to separate and while the phases are being collected. Preferably, the temperature of the reaction mixture (M) is reduced by cooling or by no longer supplying heat after the optional stirring has been discontinued or after phase separation but before collecting the phases.

Optionally, the mixture (M) may be centrifuged to enhance the separation of the phases.

Phase (A) and phase (B) are then collected separately in a conventional way, for example by decanting one of the phases or by removing one of the phases via an outlet in the bottom of the container. Sometimes an interface may be present after phase separation between two phases, which interface may be collected separately or together with either of the two phases. Occasionally, when the PUR material formulation included mineral loads, for example calcium carbonate, a solid fraction comprising these mineral loads is formed as well.

The method according to the present invention may be conducted batchwise or continuously.

In a preferred embodiment of the method according to the present invention, the amount of the recovered polyol compound in phase (A), relative to the total weight of phase (A), is equal to or more than 70.0 wt. %, preferably equal to or more than 75.0 wt. %, preferably equal to or more than 80.0 wt. %, preferably equal to or more than 85.0 wt. %, more preferably equal to or more than 90.0 wt. %, more preferably equal to or more than 92.5 wt. %, more preferably equal to or more than 95.0 wt. %.

In a preferred embodiment of the method according to the present invention, the yield of the recovered polyol compound, calculated as the weight of the recovered polyol compound relative to the total weight of the at least one polyol compound in the PUR material, is equal to or more than 50.0%, preferably equal to or more than 60.0%, preferably equal to or more than 70.0%, more preferably equal to or more than 80.0%, more preferably equal to or more than 95.0%.

The yield of the recovered polyol compound is calculated by dividing the weight of the recovered polyol compound by the total weight of the at least one polyol compound which was used to manufacture the PUR material (weight of the PUR material multiplied by the polyol compound content).

In a preferred embodiment of the method according to the present invention, the yield of the at least one TDA compound remaining in phase (A), calculated as the molar amount of the TDA compound relative to the total molar amount of the TDI compound comprised in the PUR materials, is equal to or less than 5.0%, preferably equal to or less than 4.5%, preferably equal to or less than 4.0%, more preferably equal to or less than 3.5%, more preferably equal to or less than 3.0%, even more preferably equal to or less than 2.5%, even more preferably equal to or less than 2.0%.

The yield of the TDA compound remaining in phase (A) is calculated by dividing the molar amount of the TDA compound in phase (A) by the total molar amount of the TDI compound in the PUR material which is alcoholised.

The procedure for the determination of the yield of the TDA compound remaining in phase (A) is explained in detail in the experimental section.

Furthermore, the inventors have surprisingly found that, in the method of the present invention for alcoholising and hydrolysing polyurethane (PUR) materials made from at least one polyol compound and at least one TDI compound, as detailed above, the use of PUR materials starting from TDI combined with the use of the at least one alcoholising compound, as detailed above, results in the TDA compounds and/or, when present, the TCA compounds, and/or, when present, the TDC compounds having good to excellent distribution coefficients, as demonstrated in the experimental section.

Within the context of the present invention, the distribution coefficients of the TDA compounds [hereinafter $D_{TDA}$], the TCA compounds [hereinafter $D_{TCA}$], and the TDC compounds [hereinafter $D_{TDC}$] are calculated by dividing the weight fraction in the upper phase (A) by the weight fraction in the lower phase (B) of the TDA compounds, TCA compounds, TDC compounds, respectively.

The procedure for the determination of $D_{TDA}$, $D_{TCA}$, and $D_{TDC}$ is further explained in more detail in the experimental section.

Advantageously, $D_{TDA}$, as detailed above, is equal to or less than 0.70, preferably equal to or less than 0.65, more preferably equal to or less than 0.60, even more preferably equal to or less than 0.55, and most preferably equal to or less than 0.50.

Advantageously, $D_{TCA}$, as detailed above, is equal to or less than 0.70, preferably equal to or less than 0.60, more preferably equal to or less than 0.50, more preferably equal to or less than 0.40, more preferably equal to or less than 0.30, even more preferably equal to or less than 0.20, most preferably equal to or less than 0.15.

Preferably, $D_{TDC}$, as detailed above, is equal to or less than 0.40, more preferably equal to or less than 0.35, more preferably equal to or less than 0.30, more preferably equal to or less than 0.25, more preferably equal to or less than 0.20, more preferably equal to or less than 0.15, even more preferably equal to or less than 0.10, most preferably equal to or less than 0.05.

As said, in the method of the present invention, phase (B) is subjected to at least one hydrolysis step, thereby forming a phase (B1).

The hydrolysis step can be carried out according to standard methods known in the art. The skilled in the art can carry out the hydrolysis reaction by using his practical skills in which the hydrolysis reaction conditions are chosen in such a way that equilibrium is reached in a reasonable period of time. It is understood that the reaction conditions for the hydrolysis such as temperature, reaction time and pressure depend on the alcoholising compound that has been used during alcoholysis, as well as on the scale of the reaction.

Generally, the hydrolysis of the phase (B) is conducted while the phase (B) is subjected to a pressure ranging from ambient pressure to 10 bar, preferably from ambient pressure to 5 bar and most preferably to ambient pressure.

In a preferred embodiment of the method according to the present invention, it is understood that the hydrolysis of the phase (B) is preferably conducted under stirring and in a non-oxidising atmosphere, like under a $N_2$ or $CO_2$ blanket.

According to one embodiment of the method according to the present invention, phase (B) is subjected to at least one neutral hydrolysis step, thereby forming a phase ($B1_N$).

In general, the at least one neutral hydrolysis step is carried out by using an aqueous solvent. Such aqueous solvent may be for example water, salt water or any other aqueous mineral salt solution. Suitable salts to be used in above mentioned salt water or aqueous mineral salt solutions include notably alkali or earth alkali chlorides, and the like. Preferably, the aqueous solvent is water.

Preferably, the at least one neutral hydrolysis step is conducted by adding water to the collected phase (B). It is understood that the addition of the water may be started at any stage after the phase (B) has been collected.

The amount of water needed in order to complete the at least one neutral hydrolysis of phase (B) is not limited. Advantageously, the amount of water is at least 10% by weight (wt. %), relative to the total weight of phase (B), more preferably at least 15 wt. %, even more preferably at least 20 wt. % and preferably at most 250 wt. %, relative to the total weight of phase (B), more preferably at most 225 wt. %, even more preferably at most 200 wt. %. It is understood that the neutral hydrolysis reaction conditions such as pressure, time and temperature depend on the compounds in the phase (B), the relative amount of water that is used and on the scale. A person skilled in the art is able to determine suitable neutral hydrolysis reaction conditions.

Preferably, the at least one neutral hydrolysis of phase (B) is conducted by adding water after the phase (B) has been brought to a temperature of 150° C., preferably at least 160° C., more preferably at least 170° C., and preferably at most 260° C., more preferably at most 250° C., even more preferably at most 240° C.

According to certain embodiments of the method according to the present invention, the at least one neutral hydrolysis of phase (B) is conducted by adding water gradually to the phase (B) for more than 1 hour after the gradual addition started, preferably for more than 2 hours, even more preferably for more than 3 hours and preferably at most 24 hours after the gradual addition started, more preferably at most 20 hours, even more preferably at most 15 hours.

According to certain embodiments of the method according to the present invention, the at least one neutral hydrolysis of phase (B) is conducted by adding water and after completing the addition of water, allowing the water and the phase (B) to react further for at least 1 hour, more preferably for at least 2 hours, even more preferably for at least 3 hours, and preferably at most 36 hours, more preferably at most 30 hours, even more preferably at most 24 hours, yet even more preferably at most 20 hours, most preferably at most 15 hours.

According to certain embodiments of the method according to the present invention, the at least one neutral hydrolysis of phase (B) is conducted in the presence of at least one hydrolysis promoting catalyst.

The hydrolysis promoting catalyst may be added to the phase (B) before the at least one neutral hydrolysis has started or may be dissolved in the amount of water needed in order to complete the at least one neutral hydrolysis of phase (B). Such a hydrolysis promoting catalyst is added in an amount of from 0.001 to 5% by weight, preferably of from 0.001% to 0.25% and most preferably from 0.001 to 0.08% by weight relative to the total weight of phase (B).

Non-limiting examples of hydrolysis promoting catalysts include metal hydroxides like LiOH, KOH, NaOH and CsOH, Lewis acids such as $FeCl_3$, morpholine compounds such as methyl-morpholine-N-oxide and tin compounds such as dimethyltin dilaurylmercaptide. Preferably, the hydrolysis promoting catalyst is KOH or NaOH, more preferably KOH. It is understood that the at least one neutral hydrolysis of phase (B) is preferably conducted in a non-oxidising atmosphere, like under a $N_2$ or $CO_2$ blanket.

According to another embodiment, phase (B) is subjected to at least one alkaline hydrolysis step, thereby forming a phase ($B1_A$).

In general, the at least one alkaline hydrolysis step is carried out by using an aqueous solvent and at least one base.

Although any order of admixing the water, the at least one base and the phase (B) may be used, it is typically useful to first add the at least one base to the aqueous solvent, followed by adding the aqueous solvent comprising the at least one base to the phase (B).

Such aqueous solvent may be, for example, water, salt water or any other aqueous mineral salt solution. Suitable salts to be used in above mentioned salt water or aqueous mineral salt solutions include notably alkali or earth alkali chlorides, and the like. Preferably, the aqueous solvent is water.

Non-limiting examples of bases which notably include hydroxylic bases like LiOH, KOH, NaOH, CsOH, $Ca(OH)_2$, $Mg(OH)_2$ and $NH_4OH$. Preferably, the base is KOH or NaOH, more preferably KOH.

Preferably, the at least one alkaline hydrolysis step is conducted by adding water comprising at least one hydroxylic base, as detailed above, to the collected phase (B). Advantageously, the amount of water is at least 10% by weight (wt. %), relative to the total weight of phase (B), more preferably at least 15 wt. %, even more preferably at least 20 wt. % and preferably at most 250 wt. %, relative to the total weight of phase (B), more preferably at most 225 wt. %, even more preferably at most 200 wt. %.

Advantageously, the at least one base is comprised in the water in an amount of from at least 5% by weight (wt. %), relative to the total weight of water, more preferably at least 15 wt. %, even more preferably at least 20 wt. % and preferably at most 50 wt. %, relative to the total weight of water, more preferably at most 40 wt. %, even more preferably at most 30 wt. %.

According to certain embodiments of the method according to the present invention, the at least one alkaline hydrolysis of phase (B) is conducted by adding water comprising at least one hydroxylic base, as detailed above, after the phase (B) has been brought to a temperature of 150° C., preferably at least 160° C., more preferably at least 170° C., and preferably at most 260° C., more preferably at most 250° C., even more preferably at most 240° C.

According to certain embodiments of the method according to the present invention, the at least one alkaline hydrolysis of phase (B) is conducted by gradually adding water comprising at least one hydroxylic base, as detailed above, to the phase (B) for more than 1 hour after the gradual addition started, preferably for more than 2 hours, even more preferably for more than 3 hours and preferably at most 24 hours after the gradual addition started, more preferably at most 20 hours, even more preferably at most 15 hours.

According to certain embodiments of the method according to the present invention, the at least one alkaline hydrolysis of phase (B) is conducted by adding water comprising at least one hydroxylic base and after completing the addition of the water comprising at least one hydroxylic base, allowing the water comprising at least one hydroxylic base and the phase (B) to react further for at least 1 hour, more preferably for at least 2 hours, even more preferably for at least 3 hours, and preferably at most 36 hours, more preferably at most 30 hours, even more preferably at most 24 hours, yet even more preferably at most 20 hours, most preferably at most 15 hours.

The inventors have surprisingly found that by using the at least one alcoholising compound, as detailed above, compared to an alcoholising method using an alcoholising compound not fulfilling the above mentioned requirements, the yield of the at least one TDA compound remaining in phase (B1), expressed as the molar amount of the TDA compound in phase (B1) relative to the total molar amount of the TDI compound comprised in the PUR materials, is considerably increased even without an extraction or distillation step of phase (B1).

In an embodiment of the method according to the present invention, the yield of the at least one TDA compound remaining in phase (B1), calculated as the molar amount of the TDA compound relative to the total molar amount of the TDI compound comprised in the PUR materials, is equal to or more than 40.0%, or equal to or more than 50.0%, or equal to or more than 60.0%, or equal to or more than 70.0%, preferably equal to or more than 80.0%, preferably equal to or more than 90.0%, more preferably equal to or more than 95.0%.

The yield of the TDA compound remaining in phase (B1) is calculated by dividing the molar amount of the TDA compound in phase (B1) by the total molar amount of the TDI compound in the PUR material which was alcoholised.

The procedure for the determination of the yield of the TDA compound remaining in phase (B1) is explained in detail in the experimental section.

In another embodiment of the method according to the present invention, when present, the weight fraction of the TCA compounds [hereinafter (TCA)wt. %] in the phase (B1), relative to the total weight of the phase (B1), is equal to or less than 15.0 wt. %, or equal to or less than 12.0 wt. %, or equal to or less than 9.0 wt. %, or equal to or less than 6.0 wt. %, or equal to or less than 4.0 wt. %, or equal to or less than 3.0 wt. %, or equal to or less than 2.0 wt. %, or equal to or less than 1.5 wt. %.

As said, phase (A), most commonly the upper phase, predominantly comprises at least one recovered polyol compound from which the PUR material was made. The phase (A) is typically characterised by a hydroxyl value Y. The hydroxyl value Y of phase (A) may be determined by using titration measurements according to the standard method ASTM E1899, as mentioned above. However, contaminating compounds in phase (A) such as amine compounds and optional alcoholysis accelerators may contribute to the hydroxyl value. Therefore, the hydroxyl value Y of phase (A) may also be approached theoretically by multiplying the weight fractions of the compounds with their respective theoretical hydroxyl values. The weight fractions of the compounds were determined via integration of the NMR signal peaks from characteristic protons. The different compounds contributing to the OH-value are the recovered polyol compound, the alcoholising compound, carbamate-amine compounds, diamine compounds and optional alcoholysis accelerators. The procedure is explained in detail in the experimental section.

Furthermore, a corrected hydroxyl value $Y_c$ may be calculated by subtracting the contribution of the carbamate-amine and diamine compounds and of the optional alcoholysis accelerators from the hydroxyl value Y. With this approach, only the contribution of the recovered polyol compound and the alcoholising compound remaining in the phase (A) is taken into account.

In another embodiment of the method according to the present invention, phase (B1), in particularly phase ($B1_N$) or phase ($B1_A$) is further subjected to a purification step by for example evaporation, distillation or ion-exchange treatments, to isolate the at least one diamine compound.

It is understood that this purification step may also be applied to phase (B) before it has been hydrolysed to phase (B1).

In a preferred embodiment of the method according to the present invention, phase (B1), in particularly phase ($B1_N$) or phase ($B1_A$), is further subjected to a an ion-exchange treatment, thereby forming a phase (B2), in particularly phase ($B2_N$) or phase ($B2_A$).

Ion exchange treatments are well-known in the art and have been extensively described.

The ion exchange treatment may be carried out by a weak cation exchanger, such as Dowex MAC-3, in the proton form with a dry capacity of 3.8 meq/ml. Preferably, the ion exchange is performed in a batch setup wherein the phase (B2), in particularly phase ($B2_N$) or phase ($B2_A$) is dissolved in a two-fold excess by weight of a solvent such as methanol. The mixture of the phase (B2), in particularly phase ($B2_N$) or phase ($B2_A$) and the solvent may be mixed with the ion exchanger, preferably at room temperature during 30 minutes, the liquid phase may be removed and the ion exchanger may be further washed with a solvent such as methanol. Finally the solvent may be removed from the liquid phase via evaporation, for example at 70° C. when methanol was used as solvent. The ion exchanger may be regenerated with acidified methanol containing 5 wt. % of hydrogen chloride and the acidified methanol and the remaining methanol may be removed via evaporation at 70° C.

In one embodiment of the method according to the present invention, phase (B1), in particularly phase ($B1_N$) or phase ($B1_A$) or (B2), in particularly phase ($B2_N$) or phase ($B2_A$) is further subjected to an amine conversion step, thereby forming at least one recovered isocyanate compound.

As said, the at least one diamine compound present in phase (B1), in particularly phase ($B1_N$) or phase ($B1_A$) or (B2), in particularly phase ($B2_N$) or phase ($B2_A$) may be converted to its respective isocyanate compound which can be reused for producing new PUR materials. The conversion of the amine compounds to isocyanates is well known in the art and may be performed by, for example, phosgenation of the diamine compounds by the addition of phosgene.

As said, the inventors have now found that by using the at least one alcoholising compound, as detailed above, dicarbamate and carbamate-amine compounds may be partially or fully converted to diamine compounds by hydrolysis of phase (B) to phase (B1). The inventors have further found that ion exchange treatments are able to isolate these diamine compounds from the phase (B) or (B1) in a very efficient way. After purification, these diamine compounds may be converted, for example by phosgenation, for example by phosgenation, to their respective diisocyanate compounds which can be reused for producing new PUR materials.

If desired, phase (A) may be further subjected to a purification step to reduce the amount of by-products.

Suitable purification techniques for phase (A) are well known in the art and include, but are not limited to, evaporation, filtration, distillation, extraction, (acid) washing, ion exchange treatments and combinations of two or more thereof.

When phase (A) is further subjected to an extraction process, comprising bringing the phase (A) into contact with an extracting compound, mixing the extracting compound and the phase (A), thereby forming an extraction mixture and allowing the extraction mixture to separate into a phase (A1) and a phase (E), at least one extraction compound may be used which is the same as the at least one alcoholising compound used to form phase (A) or which is a different one therefrom, preferably the same.

Phase (A1) comprises a recovered polyol compound from which the PUR material was made while phase (E) comprises the extracting compound and some of the contaminants which were present in phase (A).

The extraction process is carried out as a conventional extraction process. It may be carried out batchwise or continuously. If the process is carried out batchwise this may be done once or preferably at least two and more preferably 2 to 15 times. The extraction process may be conducted at room temperature or at elevated temperature provided the temperature applied is lower than the boiling point of the extracting compound under the conditions applied. In general the temperature may range from ambient temperature to 240° C. but preferably from 150 to 240° C. and most preferably from 180 to 220° C. at ambient pressure to 10 bar, preferably ambient pressure to 5 bar, most preferably at ambient pressure. Once the phase (A) and the extracting compound have been combined, they are mixed. The amount of extracting compound used may vary between wide ranges. Preferably the weight ratio of extracting compound and phase (A) is at least 0.1:1 and most preferably 0.25-10:1. The mixing preferably is continued for a period of time from 1 minute to 8 hours, more preferably from 5 minutes to 3 hours preferably under a $N_2$ blanket. If desired, the extraction may be conducted in the presence of a catalytic amount of a catalyst like LiOH, KOH or NaOH.

After the mixing is discontinued the extraction mixture is left in order to allow the extraction mixture to separate in two phases, phase (A1) and phase (E), then the phases are collected. Phase separation and the collection of the phases is conducted essentially in the same way as described above for mixture (M). The extraction process may be integrated with the alcoholysis in a batchwise way or in a continuous process.

In another embodiment of the method according to the present invention, phase (A) is further subjected to an ion-exchange treatment thereby forming a phase (A2).

Ion exchange treatments are well-known in the art and have been extensively described.

The ion exchange treatment may be carried out by a strong cation exchanger, such as Dowex 50WX2, in the proton form with a dry capacity of 3 meq/ml. Preferably, the ion exchange is performed in a batch setup wherein the phase (A) is dissolved in a solvent such as methanol at room temperature.

Yet another aspect of the present invention is the phase (B), phase (B1) and phase (B2) obtainable by the method according to the present invention, as detailed above.

Another aspect of the present invention is the phase (A), phase (A1) or phase (A2) obtainable by the method according to the present invention, as detailed above.

Yet another aspect of the present invention is a PUR material prepared from the recovered isocyanate compound obtainable by the method according to the present invention, as detailed above.

Yet another aspect of the present invention is a PUR material prepared from phase (A), phase (A1) or phase (A2) obtainable by the method according to the present invention, as detailed above.

Yet another aspect of the present invention is a PUR material prepared from phase (A), phase (A1) or phase (A2) obtainable by the method according to the present invention, as detailed above, and from the recovered isocyanate compound obtainable by the method according to the present invention, as detailed above.

Yet another aspect of the present invention is a process for preparing PUR materials by reacting the recovered isocyanate compound obtainable by the method according to the present invention, as detailed above, with at least one polyol compound.

Yet another aspect of the present invention is a process for preparing PUR materials by reacting phase (A), phase (A1) or phase (A2) obtainable by the method according to the present invention, with at least one polyisocyanate compound.

Yet another aspect of the present invention is a process for preparing PUR materials by reacting phase (A), phase (A1) or phase (A2) obtainable by the method according to the present invention, as detailed above, with the recovered isocyanate compound obtainable by the method according to the present invention, as detailed above.

It is further understood that all definitions and preferences, as described above, equally apply for all further embodiments, as described below.

EXAMPLES

The invention will be now described in more details with reference to the following examples, whose purpose is merely illustrative and not intended to limit the scope of the invention.

All contents in these examples are given in grams or parts by weight (pbw) relative to 1 part by weight of PUR material, unless stated otherwise.

Alcoholising Compound:

The following raw materials, i.e. alcoholising compounds, have been used in the presented examples (Table 1). These alcoholising compounds may be commercially available or may be chemically synthesised. 2,4-Bis(hydroxymethyl)-1,5-pentanediol was synthesised in an adapted two-step procedure as further described in detail.

TABLE 1 alcoholising compounds used in the presented examples

| Alcoholising compound according to the invention | Purity | Company |
|---|---|---|
| Diethylene glycol | 99% | Sigma-Aldrich BVBA |
| 2A-Bis(hydroxymethyl)-1,5-pentanediol | — | |
| Diglycerol | 90%+ | Inovyn |
| Ethylene glycol | PA 99.5% | Fisher Scientific |

The following alcoholising compounds have been described in the invention and reported in Table 2 according to their molecular weight, melting temperature and hydroxyl functionality, respectively. These alcoholising compounds may be commercially available or may be chemically synthesised using conventional methods known to the skilled in the art.

TABLE 2 alcoholising compounds described in the invention

| Alcoholising compound according to the invention | Molecular weight (g · mol$^{-1}$) | Melting temperature $T_m$ (° C.) | Hydroxyl functionality OH |
|---|---|---|---|
| diethylene glycol | 106 | −10 | 2 |
| 2,4-bis(hydroxymethyl)-1,5-pentanediol | 164 | 129-130 | 4 |
| (meso-)erythritol | 122 | 118-120 | 4 |
| xylitol | 152 | 94-97 | 5 |
| sorbitol | 182 | 98-100 | 6 |
| mannitol | 182 | 167-170 | 6 |
| fucitol | 166 | 153-154 | 5 |
| iditol | 182 | 78-80 | 6 |
| arabitol | 152 | 101-104 | 5 |
| ribitol | 152 | 102 | 5 |
| galactitol | 182 | 188-189 | 6 |
| 1,5-pentanediol | 104 | −18 | 2 |
| 2-(hydroxymethyl)-1,5-pentanediol | 134 | | 3 |
| 2,2-bis(hydroxymethyl)-1,5-pentanediol | 164 | | 4 |
| 2,2,4-tris(hydroxymethyl)-1,5-pentanediol | 194 | | 5 |
| 2,2,4,4-tetrakis(hydroxymethyl)-1,5-pentanediol | 224 | | 6 |
| 2,5-anhydromannitol | 164 | 101-103 | 4 |
| 3-hydroxymethyl-1,3,5-pentanetriol | 150 | | 4 |
| 3,4-bis(hydroxymethyl)-1,6-hexanediol | 178 | 92 | 4 |
| N,N,N',N'-tetrakis(2-hydroxyethyl)ethylenediamine | 236 | | 4 |
| P,P,P,P-tetrakis(2-hydroxyethyl)phosphonium chloride | 190 | 154 | 4 |
| di-2-glyceryl ether or 2,4-bis(hydroxymethyl)-3-oxopentane-1,5-diol | 150 | 76-78 | 4 |
| 2-hydroxymethyl-1,3,5-pentanetriol | 150 | | 4 |
| 2,4-bis(hydroxymethyl)-1,3,5-pentanetriol | 180 | | 5 |
| 1,3,5,7-heptanetetraol | 164 | | 4 |
| 2-hydroxymethyl-3-hydroxy-3-methyl-1,5-pentanediol | 164 | | 4 |
| 4-hydroxymethyl-1,3,5-hexanetriol | 164 | | 4 |
| 3-methyl-1,3,5,7-heptanetetraol | 178 | | 4 |
| 4-hydroxymethyl-3-hydroxy-3-methyl-1,5-hexanediol | 178 | | 4 |
| 2,2-bis(hydroxymethyl)-1,4-butanediol | 150 | 87-88 | 4 |
| 3-methyl-2,3,5,6-heptanetetraol | 178 | | 4 |
| 3,5-bis(hydroxymethyl)-2,6-heptanediol | 192 | | 4 |
| 2,2-bis(hydroxymethyl)-1,3-butanediol | 150 | 149 | 4 |
| 1,3,5-pentanetriol | 120 | | 3 |
| 2,6-bis(hydroxymethyl)-1,7-heptanediol | 192 | 91 | 4 |
| 2,2'-(methylazanediyl)bis(1,3-propanediol) | 179 | | 4 |
| 2,5-bis(hydroxymethyl)-1,6-hexanediol | 178 | 91-93 | 4 |
| 1,3,4,6-hexanetetraol | 150 | | 4 |
| 1,1,3,3-tetrakis(hydroxymethyl)-2-butanol | 194 | | 5 |
| 3-hydroxy-2,4-dimethyl-2,4-bis(hydroxymethyl)-1,5-pentanediol | 208 | | 5 |

TABLE 2-continued alcoholising compounds described in the invention

| Alcoholising compound according to the invention | Molecular weight (g · mol$^{-1}$) | Melting temperature $T_m$ (° C.) | Hydroxyl functionality OH |
|---|---|---|---|
| trimethylolpropane | 134 | 56-58 | 3 |
| trimethylolethane | 120 | 193-195 | 3 |
| di(trimethylolpropane) | 250 | 108-111 | 4 |
| di(trimethylolethane) | 222 | | 4 |
| diglycerol | 166 | | 4 |
| ethylene glycol | 62 | −13 | 2 |

Italics and underlined: alcoholising compounds used in the examples

Synthesis of Alcoholising Compound 2,4-Bis(hydroxymethyl)-1,5-pentanediol was synthesized in two steps starting from formaldehyde and dimethyl malonate (Scheme 1). The procedure was adapted from Gogoll et al., Chem. Eur. J. 2001, 7, 396-403.

Scheme 1. Synthesis of 2,4-bis(hydroxymethyl)-1,5-pentanediol from dimethyl malonate and formaldehyde.

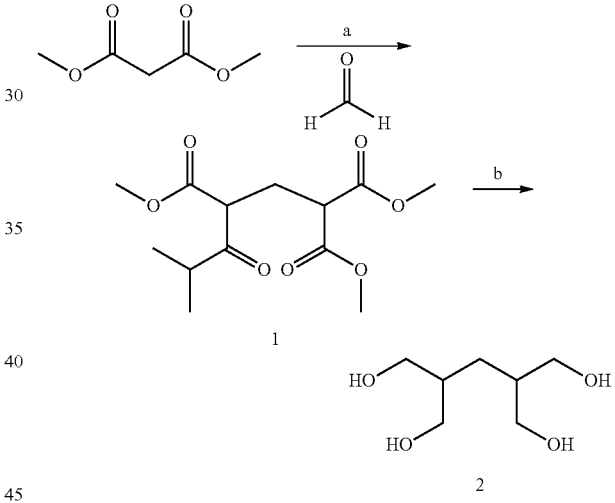

Step a: base-catalysed condensation of formaldehyde and dimethyl malonate to propane-1,1,3,3-tetracarboxylic acid tetramethyl ester (1). A 100 mL round-bottom flask was equipped with a magnetic stirring bar and a reflux condenser. The recipient was charged with formaldehyde (1.09 g paraformaldehyde, 36.3 mmol, 1 equiv.) and dimethyl malonate (19.30 g, 146.1 mmol, 4 equiv.), and heated in an oil bath at 70° C. while stirring. After addition of KOH (10 wt. % in methanol, 10-15 drops) the temperature was increased to 95° C. and the reaction was continued for about 15 hours. After cooling, an aqueous HCl solution (pH 3, 100 mL) was added to the product mixture, followed by extraction with ethyl acetate (100 mL and 2×50 mL). The combined organic phases were dried over anhydrous Na$_2$SO$_4$ and concentrated by solvent evaporation at 50° C. under vacuum. Excess dimethyl malonate and residual solvent were distilled off through a short column under reduced pressure (130° C., <50 mbar). White crystals (6.17 g; 61% yield) were obtained upon cooling. The characterisation data are consistent with those reported by Gogoll et al., Chem. Eur. J. 2001, 7, 396-403.

$^1$H NMR (400 MHz, CDCl$_3$): δ=3.74 (s, 12H; —CH$_3$), 3.51 (t, J(H,H)=7.5 Hz, 2H; —CH—), 2.48 (t, J(H,H)=7.5 Hz, 2H; —CH$_2$—) ppm; $^{13}$C NMR (100.6 MHz, CDCl$_3$): δ=169.1, 52.9, 49.2, 27.5 ppm; GC-MS (EI, 70 eV): m/z (rel. int., %): 277 [M+1]$^+$, 245 (28), 216 (18), 213 (36), 185 (11), 184 (16), 181 (9), 158 (5), 157 (20), 156 (10), 153 (19), 146 (9), 145 (100), 132 (12), 126 (5), 115 (9), 114 (6), 113 (82), 101 (15), 100 (7), 99 (5), 98 (8), 69 (13), 59 (19), 55 (15).

Step b: reduction of propane-1,1,3,3-tetracarboxylic acid tetramethyl ester (1) to 2,4-bis(hydroxymethyl)-1,5-pentanediol (2). A dry and argon-flushed three-necked 250 mL round-bottom flask was equipped with a magnetic stirring bar and a reflux condenser and the flask was charged with anhydrous tetrahydrofuran (100 mL). Subsequently, the recipient was cooled to 0° C. in an ice bath, followed by the addition of lithium aluminum hydride (6.87 g, 181.0 mmol, 10 equiv.) to the medium. A solution of propane-1,1,3,3-tetracarboxylic acid tetramethyl ester (1, 5.03 g, 18.2 mmol, 1 equiv.) in anhydrous tetrahydrofuran (40 mL) was prepared in a separate flask. Then at 0° C., this solution was added dropwise and very carefully over 30 minutes to the stirred LiAlH$_4$ suspension. Gas evolution was noticed. Afterwards, stirring was continued for 1 hour while keeping the temperature at 0° C. The suspension was subsequently heated for 16 hours in an oil bath at 85° C. while stirring at 300 rpm. The recipient was then cooled to 0° C. in an ice bath and residual LiAlH$_4$ was carefully quenched by the addition of water (1 mL), aqueous KOH solution (1 M, 6.5 mL) and water (5 mL). The slurry was stirred for 30 minutes at 0° C., followed by Buchner filtration. The solid residue was extracted for 24 hours in a Soxhlet apparatus by heating tetrahydrofuran (300 mL) in an oil bath at 100° C. Afterwards, the solvent was removed by evaporation at 60° C. under reduced pressure.

The crude product (2.52 g, 75% yield) contains butylated hydroxytoluene (stabilizer in tetrahydrofuran) as impurity. The characterisation data are consistent with those reported by Gogoll et al., Chem. Eur. J. 2001, 7, 396-403.

$^1$H NMR (400 MHz, CD$_3$OD): δ=3.57 (d, J(H,H)=5.6 Hz, 8H; —CH$_2$OH), 1.79-1.70 (multiplet, 2H; —CH—), 1.29 (t, J(H,H)=6.8 Hz, 2H; —CH$_2$—) ppm; $^{13}$C NMR (100.6 MHz, CD$_3$OD): δ=64.0, 41.8, 27.4 ppm.

Polyurethane Material:

Standard PUR foam material based on TDI as polyisocyanate compound and Caradol SC48-08 as polyol compound with a hydroxyl value X of 48 mg KOH/g as determined according to standard titration methods such as ASTM 4274, ISO 14900 or ASTM E1899, wherein the PUR material had a polyol content of 55% by weight and a density of 25 kg/m$^3$ as determined according to ISO 845.

Catalyst:

Bismuth(III)neodecanoate, available from Shepherd (Bi-cat 8106)—Bi content: 19.5-20.5%.

Alcoholysis Accelerator:

2-Pyrrolidone, purity 99.5%+ available from Carl-Roth GmbH

General Procedure

A flaked PUR material with a particle size of 12 mm made from flexible PUR foam with a density of 25 kg/m$^3$ was employed in a small scale alcoholysis reaction. 2 g of alcoholising compound (0.5 pbw), 0.4 g of alcoholysis accelerator (0.1 pbw), 0.04 g of catalyst (0.01 pbw) and a magnetic stirring rod were introduced into a 22 mL glass vial. The glass vial was placed in an aluminum block at 200° C. with magnetic stirring at 700 rpm. 4 g of PUR material (1 pbw) was manually added in three subsequent portions of 1.33 g according to dissolution, thereby forming a mixture (M$_0$). After dissolution of the PUR material, the alcoholising compound and the PUR material were allowed to further react during 180 minutes, thereby forming a mixture (M). The magnetic stirring bar was removed and the mixture (M) was allowed to separate into two immiscible phases, phase (A) and phase (B), while the temperature was kept at 200° C. The vial was subsequently cooled in a water bath and centrifuged during 10 minutes at 2500 rpm. Finally the phase (A) was separated from the phase (B) via pipetting. The weight of phase (A) was measured to determine the yield of the recovered polyol compound. Phase (B) as obtained by the method according to the present invention was further subjected to an alkaline hydrolysis step, thereby forming a phase (B1$_A$), or neutral hydrolysis step, thereby forming a phase (B1$_N$). The alkaline hydrolysis step (B1$_A$) was performed with 200 wt. % of water containing 20 wt. % of KOH, relative to the total weight of the hydrolysis reaction mixture, during 24 hours at 200° C. The neutral hydrolysis step (B1$_N$) with 200 wt. % of water, relative to the total weight of the hydrolysis reaction mixture, during 24 hours at 200° C. After hydrolysis the water was removed via evaporation and the weight of the phase (B1$_A$) or phase (B1$_N$) was determined in order to determine the yield of TDA.

Test Methods

Measurements of the Melting Points by Differential Scanning Calorimetry (DSC)

Samples of the test substance and a reference material are subjected to the same controlled temperature programme (heating/cooling rate of 10° C./min). The difference in energy input necessary to maintain identical temperatures between the substance and the reference material is recorded. When the sample undergoes a phase transition, the corresponding change of enthalpy gives a departure from the base line of the heat flow record.

NMR Protocol to Determine the Purity, the OH-Value Y and the Corrected OH-Value Y$_c$ To determine the OH-value Y and Y$_c$, phase (A) was analyzed with $^1$H NMR spectroscopy. For this analysis 0.040 g of phase (A) was dissolved in 0.7 mL of DMSO-d$_6$, and analyzed with a Bruker AMX 600 MHz spectrometer. The relative weight of the different compounds is calculated by dividing the signal integral (sum of the peak areas) of the chemical shift of the characteristic protons, by the amount of equivalent protons and multiplying with the molecular weight (Mw) of the corresponding compound. The relative weight of the recovered polyol compound is calculated according to equation 1. Here, the chemical shift of the characteristic proton of the propylene oxide (PO) units in the recovered polyol compound is taken into account, therefore equation 1 further takes into account the amount of PO units in the recovered polyol compound in weight percent. The relative weight of alcoholising compound, alcoholysis accelerator and diamine compound are calculated in a similar way according to equations 2, 3 and 4. The values between brackets are the respective values which are relevant for the examples below. These values include the chemical shifts of which the signal is to be integrated of for example the recovered polyol compound which is 1.05 ppm, of the alcoholising compounds which are found in the range of 4.23 ppm to 4.63 ppm, the chemical shifts of the alcoholysis accelerator 2-pyrrolidone which are found at 2.3 and 2.1 ppm and the chemical shifts of the diamine compounds which are found at 5.86 and 5.75 ppm; the amount of characteristic protons of the recovered polyol compound (PO units) which is equal to 3, of the alcoholysis accelerator 2-pyrrolidone which is equal to 4 and of the diamine compounds which is equal to 2. The weight percentage of the recovered polyol compound in phase (A) (i.e. the purity) is calculated according to equation 5. The weight percentage of alcoholising compound, alcoholysis accelerator and diamine compounds are calculated according to equation 6, 7 and 8. The hydroxyl value Y of phase A was calculated according to equation 9.

$$rel.\ wt\ recovered\ polyol = \frac{\frac{sum\ of\ peak\ area\ (1.05\ ppm)}{number\ of\ characteristic\ protons\ (3)}}{wt\ \%\ PO} \times MwPO \qquad Eq.\ 1$$

$$rel.\ wt\ alcoholising\ compound = \qquad Eq.\ 2$$
$$\frac{sum\ of\ peak\ areas\ (4.23 - 4.63\ ppm)}{number\ of\ hydroxyl\ protons} \times Mw\ alcoholising\ compound$$

$$rel.\ wt\ alcoholysis\ accelerator = \qquad Eq.\ 3$$
$$\frac{\frac{sum\ of\ peak\ areas\ ((2.3\ ppm) + (2.1\ ppm))}{number\ of\ characteristic\ protons\ (4)}} \times Mw\ alcoholysis\ accelerator\ \left(85\frac{g}{mol}\right)$$

$$rel.\ wt\ diamine\ compound = \qquad Eq.\ 4$$
$$\frac{\frac{sum\ of\ peak\ areas\ ((5.86\ ppm) + (5.75\ ppm))}{number\ of\ characteristic\ protons\ (2)}} \times Mw\ diamine\ compound$$

$$wt\ \%\ recovered\ polyol = \frac{rel.\ wt\ recovered\ polyol}{total\ rel.\ wt} \qquad Eq.\ 5$$

$$wt\ \%\ alcoholising\ compound = \frac{rel.\ wt\ alcoholising\ compound}{total\ rel.\ wt} \qquad Eq.\ 6$$

$$wt\ \%\ alcoholysis\ accelerator = \frac{rel.\ wt\ alcoholysis\ accelator}{total\ rel.\ wt} \qquad Eq.\ 7$$

$$wt\ \%\ diamine\ compound = \frac{rel.\ wt\ diamine\ compound}{total\ rel.\ wt} \qquad Eq.\ 8$$

wherein in Eq. 5–8: total $rel.$ wt =

$rel.$ wt recovered polyol + $rel.$ wt alcoholising compound +

$rel.$ wt alcoholysis accelerator + $rel.$ wt diamine compound

The hydroxyl value Y of phase (A) is calculated according to equation 9 below.

$$OH\_value\ Y\left(in\ \frac{mg\ KOH}{g}\right) = \qquad Eq.\ 9$$
(wt % recovered polyol × OH_value $X$) +
(wt % alcoholising compound × OH_value
of alcoholishing compound) + (wt % alcoholysis
accelerator × OH_value of alcoholysis accelerator) +
(wt % diamine compounds × OH_value of diamine compounds) +
(wt % carbamate amine compounds ×
OH_value of carbamate amine compounds)

The corrected hydroxyl value $Y_c$ of phase (A) only takes into account the contribution of the recovered polyol compound and the alcoholising compound and was calculated according to equation 10 below.

$$OH\_value\ Y_c\left(in\ \frac{mg\ KOH}{g}\right) = \qquad Eq.\ 10$$
(wt % recovered polyvol × OH_value $X$) + (wt %
alcoholising compound × OH_value of alcoholising compound)

For the examples below this formula becomes:

$$OH\_value\ Y_c\left(in\ \frac{mg\ KOH}{g}\right) = \left(wt\ \%\ recovered\ polyvol \times 48\frac{mg\ KOH}{g}\right) +$$
(wt % alcoholising compound × OH_value of alcoholising compound)

The OH-values of the alcoholising compounds, the toluene diamine compounds and the toluene carbamate-amine compounds may be calculated as follows: (56100*Functionality)/Molecular weight, wherein the functionality corresponds to the respective number of OH— or $NH_2$— functional groups in the molecular structure.

The OH-value of the alcoholysis accelerator 2-pyrrolidone was determined via a standard titration method according to ASTM E1899. All OH-values can be found in Table 3 below.

It is understood that the term OH-value of the toluene diamine and toluene carbamate-amine compounds is actually intended to refer to their respective amine-numbers. For sake of simplicity, the term OH-value will be used throughout the text.

TABLE 3

|  | OH-value (in mg KOH/g) |
|---|---|
| Alcoholising compound |  |
| Diethylene glycol | 1057 |
| 2,4-Bis(hydroxymethyl)-1,5-pentanediol | 1366 |
| Ethylene glycol | 1808 |
| Diglycerol | 1351 |
| Alcoholysis accelerator |  |
| 2-Pyrrolidone | 365 |
| Amine compounds |  |
| Toluene diamine (TDA) | 340 |
| Toluene carbamate-amine (TCA) | 918 |

Yield

The amount of recovered polyol compound in phase (A) was calculated according to equation 11 below.

wt recovered polyol=wt % recovered polyol×wt phase (A)     Eq. 11

The approximate yield of the recovered polyol compound was determined by dividing the weight of the recovered polyol compound by the weight of the PUR material that was alcoholised multiplied with the original polyol compound content of the PUR material according to equation 12 below.

$$recovered\ polyvol\ yield\ (in\ \%) = \frac{wt\ recovered\ polyvol}{wt\ PUR \times polyol\ content\ PUR} \qquad Eq.\ 12$$

The amount of TDA compound present in the various phases was calculated according to equation 13 below.

$$\text{wt TDA} = \text{wt \% TDA} \times \text{wt phase} \quad \text{Eq. 13}$$

The approximate yield of the TDA compound in various phases was determined by dividing the weight of the TDA compound by the weight of the PUR material that was alcoholised multiplied with the original TDI compound content of the PUR material and a correction factor, calculated by a division of the molecular weight TDA by molecular weight of TDI, according to equation 14 below.

$$\text{TDA yield (in \%)} = \frac{\text{wt TDA}}{\text{wt PUR} \times \text{TDI content PUR} \times \frac{\text{MW TDA}}{\text{MW TDI}}} \quad \text{Eq. 14}$$

The total yield of TDA compound after alcoholysis was calculated by an addition of the TDA yield of the phase (A) and phase (B) according to equation 15.

$$\text{total TDA yield (in \%) after alcoholysis} = \text{TDA yield \% }(A) + \text{TDA yield \% }(B) \quad \text{Eq. 15}$$

Distribution Coefficient

A distribution coefficient (D) was calculated by dividing the weight fraction in the upper phase by the weight fraction in the lower phase of the respective aromatic compound. For example, the distribution coefficient of the toluene diamine compounds (TDA) [hereinafter $D_{TDA}$] was calculated by dividing the weight fraction of TDA in the upper phase (A) by the weight fraction of TDA in the lower phase (B). The same principle applies mutatis mutandis to the distribution coefficient of the toluene carbamate-amine compounds (TCA) [hereinafter $D_{TCA}$] and to the distribution coefficient of the toluene dicarbamate compounds (TDC) [hereinafter $D_{TDC}$].

NMR Protocol to Determine Aromatic Compound Composition of Phase (B), Phase ($B1_A$) and Phase ($B1_N$)

Phase (B), phase ($B1_A$) and phase ($B1_N$) were analyzed with $^1$H NMR spectroscopy. For this analysis 0.020 g of the phase (B), phase ($B1_A$) or phase ($B1_N$) was dissolved in 0.7 mL of DMSO-$d_6$ and analyzed with a Bruker AMX 600 MHz spectrometer. The relative amounts of toluene diamine compounds (TDA), toluene carbamate-amine compounds (TCA) and toluene dicarbamate compounds (TDC) are calculated by dividing the signal integral (sum of the peak areas) of the chemical shift of the characteristic protons by the amount of equivalent protons according to equations 16, 17 and 18. The values between brackets are the respective values which are relevant for the examples below. The molar composition of the aromatic compounds in phase (B), ($B1_A$) and ($B1_N$) are calculated according to equations 19, 20 and 21.

$$\text{rel. amount TDA} = \frac{\text{sum of peak areas}((5.86 \text{ ppm}) + (5.75 \text{ ppm}))}{\text{number of characteristic protons (2)}} \quad \text{Eq. 16}$$

$$\text{rel. amount TCA} = \frac{\substack{\text{sum of peak areas}((6.70 \text{ ppm}) + (6.60 \text{ ppm})) + \\ (6.50 \text{ ppm}) + (6.00 \text{ ppm}) + (5.80 \text{ ppm}))}}{\text{number of characteristic protons (3)}} \quad \text{Eq. 17}$$

$$\text{rel. amount TDC} = \frac{\text{sum of peak areas}((7.15 \text{ ppm}) + (7.05 \text{ ppm}))}{\text{number of characteristic protons (3)}} \quad \text{Eq. 18}$$

$$\text{mol \% TDA} = \frac{\text{rel. amount TDA}}{\text{rel. amount TDA} + \text{rel. amount TCA} + \text{rel. amount TDC}} \quad \text{Eq. 19}$$

$$\text{mol \% TCA} = \frac{\text{rel. amount TCA}}{\text{rel. amount TDA} + \text{rel. amount TCA} + \text{rel. amount TDC}} \quad \text{Eq. 20}$$

$$\text{mol \% TDC} = \frac{\text{rel. amount TDC}}{\text{rel. amount TDA} + \text{rel. amount TCA} + \text{rel. amount TDC}} \quad \text{Eq. 21}$$

TABLE 4

| Compound in mixture ($M_0$) | E1 | E2 | E3 | E4 |
|---|---|---|---|---|
| Alcoholising compound | | | | |
| Diethylene glycol | 0.5 | | | |
| 2,4-Bis(hydroxymethyl)-1,5-pentanediol | | 0.5 | | |
| Diglycerol | | | 0.5 | |
| Ethylene glycol | | | | 0.5 |
| PUR material | 1 | 1 | 1 | 1 |
| Catalyst | 0.01 | 0.01 | 0.01 | 0.01 |
| Alcoholysis accelerator | 0.1 | 0.1 | 0.1 | 0.1 |
| Dissolution time (in minutes) | 45 | 120 | 180 | 35 |
| Total yield of TDA after alcoholysis (in %) | 17 | 16 | 20 | 22 |
| Total yield of TDA after alcoholysis and phase (B) hydrolysis (in %) | 85 | 99 | 43 | 47 |
| Phase (A) properties | | | | |
| OH-value Y (in mg KOH/g) (Eq. 9) | 207 | 86 | 74 | 234 |
| Corrected OH-value $Y_c$ (in mg KOH/g) (Eq. 10) | 179 | 73 | 50 | 197 |
| wt. % of recovered polyol (purity) (Eq. 1 and 5) | 80.3 | 95.2 | 95.9 | 84.3 |
| Yield of recovered polyol (in %) (Eq. 11 and 12) | 64 | 99 | 99 | 87 |
| wt. % of alcoholising compound (Eq. 2 and 6) | 13.3 | 1.5 | 0.3 | 8.7 |
| wt. % of TDA (Eq. 8 and 16) | 2.0 | 1.3 | 1.8 | 2.1 |
| wt. % of TCA (Eq. 17) | 4.4 | 0.3 | 0.4 | 2.3 |
| wt. % of TDC (Eq. 18) | 2.0 | 0.0 | 0.0 | 0.0 |
| Yield of TDA (in %) (Eq. 8, 13, 14, 16) | 3 | 2 | 3 | 4 |
| Phase (B) properties | | | | |
| OH-value Y (in mg KOH/g) | 507 | 763 | 929 | 969 |
| Amine-value Y (in mg KOH/g) | 72 | 83 | 111 | 109 |
| wt. % of TDA (Eq. 8 and 16) | 4.5 | 4.0 | 5.9 | 6.1 |
| wt. % of TCA (Eq. 17) | 9.2 | 13.9 | 16.7 | 15.8 |
| wt. % of TDC (Eq. 18) | 12.4 | 15.0 | 2.0 | 3.1 |
| Yield of TDA On %) (Eq. 8, 13, 14, 16) | 14 | 12 | 17 | 18 |
| Distribution coefficients | | | | |
| $D_{TDA}$ | 0.44 | 0.33 | 0.31 | 0.34 |
| $D_{TCA}$ | 0.48 | 0.02 | 0.02 | 0.15 |
| $D_{TDC}$ | 0.16 | 0.0 | 0.0 | 0.0 |
| Phase ($B1_A$) properties | | | | |
| OH-value Y (in mg KOH/g) | 674 | — | 983 | 929 |
| Amine-value Y (in mg KOH/g) | 239 | — | 164 | 169 |
| wt. % of TDA (Eq. 8 and 16) | 26.0 | — | 13.9 | 14.7 |
| wt. % of TCA (Eq. 17) | 0.0 | — | 10.6 | 10.2 |
| wt. % of TDC (Eq. 18) | 0.0 | — | 0.0 | 0.0 |
| Yield of TDA (in %) (Eq. 8, 13, 14, 16) | 82 | — | 40 | 43 |

TABLE 4-continued

| Compound in mixture (M₀) | E1 | E2 | E3 | E4 |
|---|---|---|---|---|
| Phase (B1$_N$) properties | | | | |
| OH-value Y (in mg KOH/g) | 674 | 1022 | — | — |
| Amine-value Y (in mg KOH/g) | 239 | 219 | — | — |
| wt. % of TDA (Eq. 8 and 16) | 26.0 | 23.5 | — | — |
| wt. % of TCA (Eq. 17) | 0.0 | 1.2 | — | — |
| wt. % of TDC (Eq. 18) | 0.0 | 0.4 | — | — |
| Yield of recovered TDA (in %) (Eq. 8, 13, 14, 16) | 82 | 97 | — | — |

Overall, the results in Table 4 show that the OH-value Y and the theoretical OH-value $Y_c$ of the phases (A) vary from close in case of diglycerol and 2,4-bis(hydroxymethyl)-1,5-pentanediol to multiple times in case of e.g. diethylene glycol to the OH-value of the original polyol compound (i.e. 48 mg KOH/g). Additionally, Table 4 clearly shows that phase (A) was characterised by a low (TDA+TCA+TDC) wt. % and a high wt. % of recovered polyol, i.e. >80 wt. %, relative to the total weight of phase (A), and a low TDA yield, i.e. <5%, relative to the TDI compound comprised in the PUR materials. Phase (B) generally consists of a mixture of the alcoholising compound, alcoholysis accelerator, TDA, TCA and TDC. Subsequently, the phase (B) was subjected to a hydrolysis reaction to reduce the amounts of TCA and TDC significantly and therefore increase the corresponding TDA yield via said hydrolysis reaction to a large extent relative to the TDI compound comprised in the PUR materials. Furthermore, the distribution coefficients of the TDA compounds ($D_{TDA}$), the distribution coefficients of the TCA compounds ($D_{TCA}$), and the distribution coefficients of the TDC compounds ($D_{TDC}$) are respectively calculated and shown in Table 4. $D_{TDA}$ is less dependent of the used alcoholising compound with values varying between 0.31 for diglycerol and 0.44 for diethylene glycol. Moreover, TDA predominantly settles in the, more polar, lower phase (B). It has been further found that, when compared to $D_{TDA}$, $D_{TCA}$ and $D_{TDC}$ are significantly and substantially lower in value, with the exception of $D_{TCA}$ for diethylene glycol (0.48). $D_{TCA}$ shows a clear dependency of the used alcoholising compound with values varying between 0.48 for diethylene glycol and 0.02 for both 2,4-bis(hydroxymethyl)-1,5-pentanediol and diglycerol, thereby clearly demonstrating that TCA predominantly settles in the, more polar, lower phase (B). Furthermore, it has been shown that the values for $D_{TDC}$ vary between 0.16 for diethylene glycol and 0.0 for 2,4-bis(hydroxymethyl)-1,5-pentanediol, diglycerol, and ethylene glycol, thereby clearly demonstrating that TDC predominantly settles in the, more polar, lower phase (B), whereas almost none of the formed TDC compounds settles in the upper phase (A).

TABLE 5

| Alcoholising compound | Molar composition (in %) in phase (B) | Molar composition (in %) in phase (B1$_A$) |
|---|---|---|
| E1: DEG | | |
| Toluene dicarbamates (TDC) (Eq. 18 and 21) | 31.2 | 0 |
| Toluene carbamate-amines (TCA) (Eq. 17 and 20) | 49.8 | 0 |
| Toluene diamines (TDA) (Eq. 16 and 19) | 19.0 | 100 |
| E3: Diglycerol | | |
| Toluene dicarbamates (TDC) (Eq. 18 and 21) | 6.0 | 0 |
| Toluene carbamate-amines (TCA) (Eq. 17 and 20) | 63.7 | 34.8 |
| Toluene diamines (TDA) (Eq. 16 and 19) | 30.3 | 65.2 |
| E4: EG | | |
| Toluene dicarbamates (TDC) (Eq. 18 and 21) | 8.7 | 0 |
| Toluene carbamate-amines (TCA) (Eq. 17 and 20) | 62.1 | 33.9 |
| Toluene diamines (TDA) (Eq. 16 and 19) | 29.2 | 66.1 |

| Alcoholising compound | Molar composition (in %) in phase (B) | Molar composition (in %) in phase (B1$_N$) |
|---|---|---|
| E2: 2,4-Bis(hydroxymethyl)-1,5-pentanediol | | |
| Toluene dicarbamates (TDC) (Eq. 18 and 21) | 41.3 | 0.9 |
| Toluene carbamate-amines (TCA) (Eq. 17 and 20) | 45.5 | 3.6 |
| Toluene diamines (TDA) (Eq. 16 and 19) | 13.2 | 95.5 |

The molar composition (in %) of the aromatic compounds TDC, TCA and TDA in the phase (B) and the hydrolysed phases (B1$_A$) and (B1$_N$) are shown in Table 5. The aromatic compounds of the phase (B) generally consist of TDA, TCA and TDC, with the exception that the phase (B) that was obtained via the use of diglycerol as the alcoholising compound (E3, Table 5) did not contain TDC. Upon hydrolysis of the phases (B), Table 5 clearly shows that in particular the use of DEG or 2,4-bis(hydroxymethyl)-1,5-pentanediol as the alcoholising compound in the hydrolysis reaction resulted in an almost complete conversion of the carbamate functional groups of TCA and TDC into the amine groups of TDA.

The project leading to this application has received funding from the European Union's Horizon 2020 Research and Innovation Programme under grant agreement No 814543.

The invention claimed is:

1. A method for alcoholising and hydrolysing polyurethane (PUR) materials made from at least one polyol compound and at least one toluene diisocyanate based compound, hereinafter TDI compound; wherein the method comprises the following steps:

contacting the polyurethane material with at least one alcoholising compound, thereby forming a reaction mixture ($M_O$) and allowing the polyurethane material and the alcoholising compound to react in said reaction mixture ($M_O$), thereby forming a mixture (M);

allowing the mixture (M) to separate into at least an upper phase, hereinafter phase (A), and a lower phase, hereinafter phase (B), wherein phase (A) and phase (B) are two immiscible phases;

subjecting phase (B) to at least one hydrolysis step, thereby forming a phase (B1);

wherein phase (B) comprises at least a toluene diamine compound, hereinafter TDA compound, and a toluene dicarbamate compound, hereinafter TDC compound;

wherein the at least one alcoholising compound is characterized by a melting point of lower than 200° C.;

wherein the at least one alcoholising compound is characterized by a hydroxyl functionality of at least 2; and with the proviso that the at least one alcoholising compound is not glycerol.

2. The method according to claim 1, wherein the (TDA+TDC) wt. % in the phase (B), relative to the total weight of the phase (B), is more than 10.0 wt. %.

3. The method according to claim 1, wherein the (TDA+TDC) wt. % in the phase (B), relative to the total weight of the phase (B), is more than 13.0 wt. %.

4. The method according to claim 1, wherein the (TDA+TDC) wt. % in the phase (B), relative to the total weight of the phase (B), is more than 16.0 wt. %.

5. The method according to claim 1, wherein the at least one alcoholising compound is selected from the group consisting of diethylene glycol, 2,4-bis(hydroxymethyl)-1,5-pentanediol, diglycerol, ethylene glycol, (meso-) erythritol, xylitol, sorbitol, mannitol, fucitol, iditol, arabitol, ribitol, galactitol, 1,5-pentanediol, 2-(hydroxymethyl)-1,5-pentanediol, 2,2-bis(hydroxymethyl)-1,5-pentanediol, 2,2,4-tris(hydroxymethyl)-1,5-pentanediol, 2,2,4,4-tetrakis(hydroxymethyl)-1,5-pentanediol, 2,5-anhydromannitol, 3-hydroxymethyl-1,3,5-pentanetriol, 3,4-bis(hydroxymethyl)-1,6-hexanediol, N,N,N',N'-tetrakis(2-hydroxyethyl)ethylenediamine, P,P,P,P-tetrakis(2-hydroxyethyl)phosphonium chloride, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 1,3,5,7-heptanetetraol, 2-hydroxymethyl-3-hydroxy-3-methyl-1,5-pentanediol, 4-hydroxymethyl-1,3,5-hexanetriol, 3-methyl-1,3,5,7-heptanetetraol, 4-hydroxymethyl-3-hydroxy-3-methyl-1,5-hexanediol, 2,2-bis(hydroxymethyl)-1,4-butanediol, 3-methyl-2,3,5,6-heptanetetraol, 3,5-bis(hydroxymethyl)-2,6-heptanediol, 2,2-bis(hydroxymethyl)-1,3-butanediol, 1,3,5-pentanetriol, 2,6-bis(hydroxymethyl)-1,7-heptanediol, 2,2'-(methylazanediyl)bis(1,3-propanediol), 2,5-bis(hydroxymethyl)-1,6-hexanediol, 1,3,4,6-hexanetetraol, 1,1,3,3-tetrakis(hydroxymethyl)-2-butanol, 3-hydroxy-2,4-dimethyl-2,4-bis(hydroxymethyl)-1,5-pentanediol, trimethylolpropane, trimethylolethane, di(trimethylolpropane), di(trimethylolethane) or mixtures of two or more thereof.

6. The method according to claim 1, wherein the at least one alcoholising compound has no 1,2-diol motif.

7. The method according to claim 6, wherein the at least one alcoholising compound is selected from diethylene glycol, 2,4-bis(hydroxymethyl)-1,5-pentanediol, 1,5-pentanediol, 2-(hydroxymethyl)-1,5-pentanediol, di-2-glyceryl ether or 2,4-bis(hydroxymethyl)-3-oxopentane-1,5-diol, 2-hydroxymethyl-1,3,5-pentanetriol, 2,4-bis(hydroxymethyl)-1,3,5-pentanetriol, 3,5-bis(hydroxymethyl)-2,6-heptanediol, 2,6-bis(hydroxymethyl)-1,7-heptanediol, 2,5-bis(hydroxymethyl)-1,6-hexanediol or mixtures of two or more thereof.

8. The method according to claim 1, wherein the amount of the at least one alcoholising compound, relative to 1 part by weight (pbw) of PUR material, is advantageously equal to or less than 10 pbw.

9. The method according to claim 1, wherein the reaction mixture ($M_O$) further comprises at least one alcoholysis accelerator selected from heterocyclic amines, straight or branched chain aliphatic amines, cycloalkylamines, aromatic amines or cyclic amides, or mixtures of two or more thereof.

10. The method according to claim 1, wherein phase (B) is subjected to at least one neutral hydrolysis step by using an aqueous solvent.

11. The method according to claim 1, wherein phase (B) is subjected to at least one alkaline hydrolysis step by using an aqueous solvent and at least one base.

12. The method according to claim 11, wherein the at least one base is comprised in the aqueous solvent, relative to the total weight of the aqueous solvent in an amount of from at least 5% by weight (wt. %), and wherein the at least one base is selected from LiOH, KOH, NaOH, CsOH, Ca(OH)$_2$, Mg(OH)$_2$ or NH$_4$OH.

13. The method according to claim 1, wherein phase (B1) is further subjected to a purification step, thereby forming a phase (B2) or phase (B1) is further subjected to an amine conversion step, thereby forming a recovered isocyanate compound.

14. The method according to claim 13, wherein phase (B2) is further subjected to an amine conversion step, thereby forming a recovered isocyanate compound.

15. The method according to claim 1, wherein phase (A) is further subjected to an extraction process, comprising bringing the phase (A) into contact with an extracting compound, mixing the extracting compound and the phase (A), thereby forming an extraction mixture and allowing the extraction mixture to separate into a phase (A1) and a phase (E).

16. The method according to claim 1, wherein phase (A) is further subjected to an ion-exchange treatment thereby forming a phase (A2).

17. A process for preparing PUR materials by reacting at least one of the following:

phase (A) obtainable by the method according to claim 1;

phase (A1) obtainable by the method according to claim 1, wherein phase (A) is further subjected to an extraction process, comprising bringing the phase (A) into contact with an extracting compound, mixing the extracting compound and the phase (A), thereby forming an extraction mixture and allowing the extraction mixture to separate into a phase (A1) and a phase (E);

phase (A2) obtainable by the method according to claim 1, wherein phase (A) is further subjected to an ion-exchange treatment thereby forming a phase (A2);

a recovered isocyanate compound obtainable by the method according to claim 1, wherein phase (B1) is further subjected to a purification step, thereby forming a phase (B2), wherein phase (B2) is further subjected to an amine conversion step, thereby forming the recovered isocyanate compound; and/or a recovered isocyanate compound obtainable by the method according to claim 1, wherein phase (B1) is further subjected to an amine conversion step, thereby forming the recovered isocyanate compound.

* * * * *